(12) United States Patent
Saito et al.

(10) Patent No.: US 11,884,152 B2
(45) Date of Patent: Jan. 30, 2024

(54) CONTROL DEVICE, MOVING BODY AND COMPUTER-READABLE STORAGE MEDIUM

(71) Applicant: HONDA MOTOR CO., LTD., Tokyo (JP)

(72) Inventors: Kazuhiro Saito, Saitama (JP); Naoki Yui, Saitama (JP); Satoshi Ohshima, Saitama (JP); Takuya Iwata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 349 days.

(21) Appl. No.: 17/190,420

(22) Filed: Mar. 3, 2021

(65) Prior Publication Data

US 2021/0291654 A1 Sep. 23, 2021

(30) Foreign Application Priority Data

Mar. 19, 2020 (JP) .................................. 2020-049739

(51) Int. Cl.
*B60K 35/00* (2006.01)
*B60T 17/22* (2006.01)

(52) U.S. Cl.
CPC ............. *B60K 35/00* (2013.01); *B60T 17/22* (2013.01); *B60K 2370/162* (2019.05); *B60K 2370/169* (2019.05); *B60T 2220/04* (2013.01)

(58) Field of Classification Search
None
See application file for complete search history.

(56) References Cited

U.S. PATENT DOCUMENTS

2006/0290202 A1* 12/2006 Shibata ..................... B60T 7/22
303/165
2011/0082632 A1* 4/2011 Rowker ................. B60K 35/00
340/453

(Continued)

FOREIGN PATENT DOCUMENTS

CN 105807763 A 7/2016
JP 2006201074 A 8/2006

(Continued)

OTHER PUBLICATIONS

Office Action issued for counterpart Japanese Application No. 2020-049739, issued by the Japanese Patent Office dated Nov. 16, 2021 (drafted on Nov. 8, 2021).

(Continued)

*Primary Examiner* — John F Mortell

(57) ABSTRACT

Provided is a control device configured to control an instrument configured to indicate a state of a moving body. The control device comprises a braking information acquisition unit configured to acquire braking information about a braking force of a braking unit configured to brake the moving body, and a display control unit configured to control display of the instrument, based on the braking information acquired by the braking information acquisition unit. The braking information includes at least one of (i) first braking information, which indicates a present setting, of a plurality of settings relating to the braking force of the braking unit and (ii) second braking information indicative of a present value of the braking force of the braking unit.

20 Claims, 15 Drawing Sheets

(56) References Cited

U.S. PATENT DOCUMENTS

2013/0325279 A1   12/2013   Fujimoto
2016/0207537 A1    7/2016   Urano

FOREIGN PATENT DOCUMENTS

| JP | 2013249026 A | 12/2013 |
| JP | 2017175739 A | 9/2017 |
| JP | 2019038452 A | 3/2019 |

OTHER PUBLICATIONS

Office Action issued for counterpart Chinese Application 202110144166.0, issued by the State Intellectual Property Office of People's Republic of China dated Aug. 26, 2023.

* cited by examiner

CONTROL DEVICE, MOVING BODY AND COMPUTER-READABLE STORAGE MEDIUM

BACKGROUND

1. Technical Field

The contents of the following Japanese patent application are incorporated herein by reference:

NO. 2020-049739 filed in JP on Mar. 19, 2020.

The present invention relates to a control device, a moving body, and a computer-readable storage medium.

2. Related Art

Patent Document 1 discloses an instrument on which acceleration generated on a vehicle is displayed. Patent Document 2 discloses an instrument on which a state of power (power state) when an electric motor travels a vehicle with electric power and a state of electricity generation (electricity generation state) when the electric motor operates as an electricity generator and generates electricity by a regenerative brake are displayed.

CITATION LIST

Patent Document

Patent Document 1: Japanese Patent Application Publication No. 2013-249026
Patent Document 2: Japanese Patent Application Publication No. 2019-038452

DESCRIPTION OF EXEMPLARY EMBODIMENTS

Figure 1:
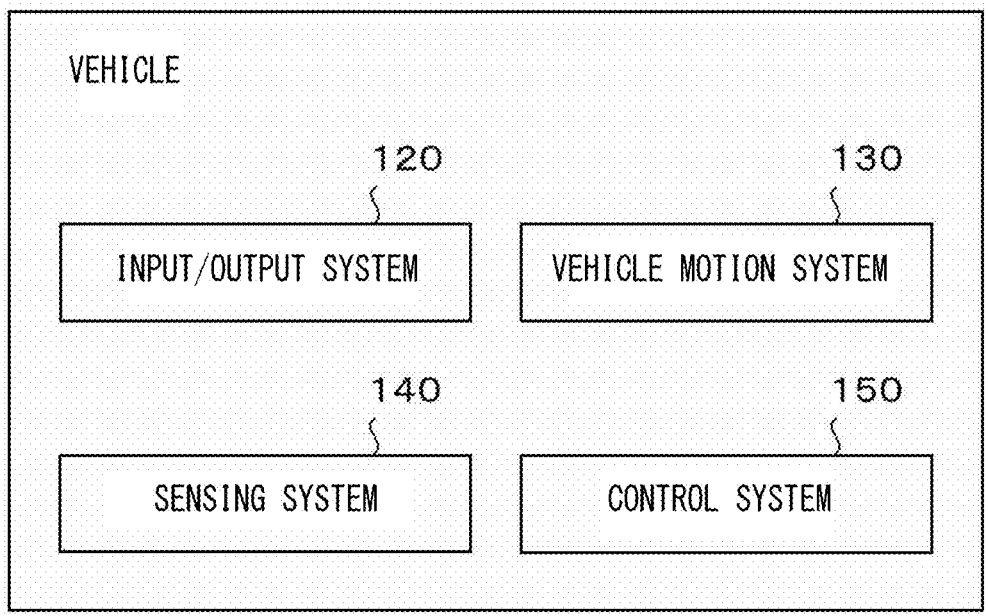
FIG. 1 schematically shows an example of a system configuration of a vehicle 100.

Hereinafter, the present invention will be described through embodiments of the invention. However, the following embodiments do not limit the invention defined in the claims. Also, all combinations of features described in the embodiments are not necessarily essential to solutions of the invention. Note that, in the drawings, the same or similar parts are denoted with the same reference signs, and the overlapping descriptions may be omitted.

[Outline of Vehicle 100]

FIG. 1 schematically shows an example of a system configuration of a vehicle 100. In the present embodiment, the vehicle 100 comprises an input/output system 120, a vehicle motion system 130, a sensing system 140, and a control system 150.

Examples of the vehicle 100 include a bicycle, an automobile, an automatic two-wheeled vehicle, an electric train and the like. Examples of the automatic two-wheeled vehicle include (i) a motorcycle, (ii) a three-wheeled motorcycle, and (iii) a standing two-wheeled vehicle or three-wheeled vehicle with a power unit such as Segway (registered trademark), a kickboard (registered trademark) with a power unit, a skateboard with a power unit and the like. The vehicle 100 preferably comprises an electricity storage device and an electric motor.

In the present embodiment, the input/output system 120 is configured to function as a user interface with a user of the vehicle 100. The user may be an occupant in the vehicle 100. The occupant may be a driver of the vehicle 100.

For example, the input/output system 120 is configured to receive a user's instruction or operation of the vehicle 100. The input/output system 120 may be configured to output information indicative of a content of the instruction or operation to the control system 150. The input/output system 120 is also configured to present the user with information indicative of a state of the vehicle 100. The input/output system 120 may also be configured to present the user with the information indicative of the state of the vehicle 100 by controlling an instrument configured to indicate the state of the vehicle 100. The input/output system 120 will be described in detail later.

In the present embodiment, the vehicle motion system 130 is configured to drive the vehicle 100, to brake the vehicle 100, and to change a traveling direction of the vehicle 100. The vehicle motion system 130 may also be configured to drive the vehicle 100 by using at least electric energy. The vehicle motion system 130 may also be configured to brake the vehicle 100 by converting at least a part of the kinetic energy of the vehicle 100 into the electric energy. The vehicle motion system 130 will be described in detail later.

In the present embodiment, the sensing system 140 is configured to measure a variety of physical quantities relating to the vehicle 100. The sensing system 140 may be configured to output information indicative of a measurement result to the control system 150. The sensing system 140 will be described in detail later.

In the present embodiment, the control system 150 is configured to control each unit of the vehicle 100. For example, the control system 150 is configured to acquire information indicative of the user's instruction or operation on the vehicle 100 from the input/output system 120. The control system 150 is configured to control the vehicle motion system 130 so that the vehicle 100 moves according to the user's instruction or operation.

The control system 150 may also be configured to manage the state of the vehicle 100. For example, the control system 150 is configured to acquire information indicative of states of each unit of the vehicle 100 from the sensing system 140. The control system 150 is configured to control the input/output system 120 to present the user with the information indicative of the state of the vehicle 100. Examples of the state of the vehicle 100 include a state of an output energy amount of the vehicle motion system 130, a state of a regenerative energy amount of the vehicle motion system 130, a state of a drive force of the vehicle 100, a state of a braking force of the vehicle motion system 130, and the like.

When the user releases the accelerator pedal during traveling of the vehicle 100, a braking force (which may also be referred to as a braking force by regeneration) is generated by an engine brake or a regenerative brake even though the user does not operate a brake pedal. In a case where the vehicle 100 has an electric motor, the user can regulate a magnitude of the braking force by regeneration, depending on the types of vehicles. In this case, the control system 150 may be configured to manage a state of a setting relating to the magnitude of the braking force by regeneration of the vehicle motion system 130, as the state of the vehicle 100. The control system 150 will be described in detail later.

[Specific Configurations of Each Unit of Vehicle 100]

Each unit of the vehicle 100 may be implemented by hardware, software or hardware and software. At least a part of each unit of the vehicle 100 may be implemented by a control unit such as an ECU (Electronic Control Unit). At least a part of each unit of the vehicle 100 may also be implemented by a personal computer or a portable terminal. For example, the personal computer or the portable terminal may be used as the user interface of the input/output system 120. Examples of the portable terminal include a mobile phone, a smartphone, a PDA, a tablet, a notebook computer or laptop computer, a wearable computer and the like.

In a case where at least some of the constitutional elements constituting the vehicle 100 is implemented by software, the constitutional elements implemented by the software may be realized as programs prescribing operations of the constitutional elements are activated in an information processing device having a general configuration. The information processing device includes, for example, (i) a data processing device having a variety of processors (for example, a CPU, a GPU and the like), a ROM, a RAM, a communication interface and the like, and (ii) a storage device (including an external storage device) such as a memory, an HDD and the like. The information processing device may also include (iii) an input device such as a keyboard, a touch panel, a camera, a microphone, diverse sensors, a GPS receiver and the like, and (iv) an output device such as a display device, a speaker, a vibration device and the like.

In the information processing device, the data processing device or the storage device may be configured to store a program. The information processing described in the program functions as a specific means where software relating to the program and a variety of hardware resources of the vehicle 100 cooperate with each other, as the program is read into the computer, for example. The specific means implements calculation or processing of information corresponding to a using purpose of the computer of the present embodiment, so that the vehicle 100 corresponding to the using purpose is established.

The program may also be stored in a computer-readable medium. The program may also be stored in a non-transitory computer-readable recording medium. The program may also be stored in a computer-readable medium such as a CD-ROM, a DVD-ROM, a memory and a hard disk, or may also be stored in a storage device connected to a network. The program may be installed into a computer, which constitutes at least a part of the vehicle 100, from the computer-readable medium or the storage device connected to the network.

By the program being executed, a computer mounted on the vehicle 100 may function as at least a part of each unit of the vehicle 100. By the program being executed, the computer mounted on the vehicle 100 may execute an information processing method in at least a part of each unit of the vehicle 100.

A program for causing a computer mounted on the vehicle 100 to function as at least a part of each unit of the vehicle 100 includes, for example, a module in which operations of at least a part of each unit of the vehicle 100 are prescribed. When the program or the module is executed, the program or the module acts on the data processing device, the input device, the output device, the storage device and the like to cause the computer to function as each unit of the vehicle 100 or to cause the computer to execute the information processing method in each unit of the vehicle 100.

In one embodiment, the information processing method may be a control method of controlling an instrument configured to indicate a state of the moving body. In the control method, the moving body includes, for example, a braking device configured to brake the moving body.

The control method includes, for example, a braking information acquisition step of acquiring braking information about a braking force of the braking device. The control method includes, for example, a display control step of controlling display of the instrument based on the braking information acquired in the braking information acquisition step. In the control method, the braking information may include at least one of (i) first braking information indicative of a present setting of a plurality of settings relating to the braking force of the braking device and (ii) second braking information indicative of a present value of the braking force of the braking device.

In the control method, the instrument may have a first object having a line shape or band shape that is continuously visually recognized. The instrument may have a second object indicative of a present value of a braking index that is an index relating to the braking force of the braking unit. A partial region on the first object may be formed with a braking region in which the present value of the braking index is indicated by a position on the region. In the braking region, a plurality of marks each corresponding to each of the plurality of settings relating to the braking force of the braking unit may be arranged in the vicinity of positions each corresponding to each of the plurality of settings.

In the control method, the display control step may include a step of controlling display of the braking object based on at least one of (i) the present setting relating to the braking force indicated by the first braking information and (ii) the present value of the braking force indicated by the second braking information.

In another embodiment, the information processing method may be a control method of controlling an instrument configured to indicate a state of a moving body. In the control method, the moving body includes, for example, an electricity storage device configured to store electric energy and a drive device configured to drive the moving body by using at least charging and discharging of the electricity storage device.

The control method includes, for example, a drive information acquisition step of acquiring drive information about at least one of an output energy amount and a regenerative energy amount of the drive device. The control method includes, for example, a display control step of controlling display of the instrument based on the drive information acquired in the drive information acquisition step.

In the control method, the instrument may have a first object having a line shape or band shape that is continuously visually recognized. The instrument may have a second object indicative of a present value of an output index that is an index relating to the output energy amount. The instrument may have a third object indicative of a present value of a regeneration index that is an index relating to the regenerative energy amount. A partial region on the first object may be formed with an output region in which a present value of the output index is indicated by a position on the region. A region different from the output region on the first object may be formed with a regeneration region in which a present value of the regeneration index is indicated by a position on the region. The output region and the regeneration region may be arranged adjacent to each other on the first object. A shape of the second object may be different from a shape of the third object.

In the control method, the display control step may include a step of controlling display of the second object based on the output energy amount indicated by the drive information. The display control step may include a step of controlling display of the third object based on the regenerative energy amount indicated by the drive information.

The vehicle 100 may be an example of the moving body. The input/output system 120 may be an example of the input unit or the instrument. The vehicle motion system 130 may be an example of the electricity storage unit, the drive unit or the braking unit. The control system 150 may be an example of the control device or the display control unit.

In the present embodiment, the control system 150 has been described in detail with reference to the example where the control system 150 controls the instrument configured to indicate the state of the vehicle 100. However, the control system 150 is not limited to the present embodiment. The control system 150 may also be configured to control an instrument configured to indicate a state of any type of the moving body.

Examples of the moving body include a ship, a flying object and the like, in addition to the vehicle. Examples of the ship include a boat, a hovercraft, a personal watercraft, a submarine, a submersible, an underwater scooter, and the like. Examples of the flying object include an airplane, an airship or a flying balloon, a balloon, a helicopter, a drone, and the like.

Figure 2:
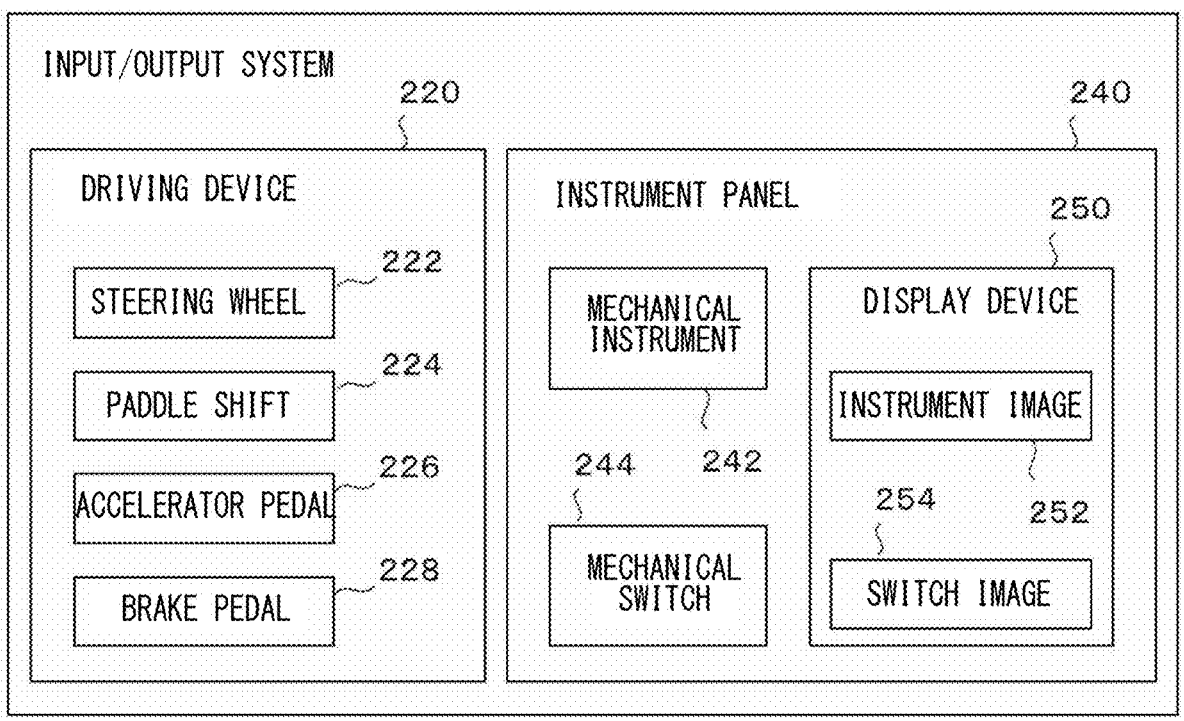
FIG. 2 schematically shows an example of an internal configuration of an input/output system 120.

FIG. 2 schematically shows an example of an internal configuration of the input/output system 120. In the present embodiment, the input/output system 120 includes a driving device 220, and an instrument panel 240. In the present embodiment, the driving device 220 includes a steering wheel 222, a paddle shift 224, an accelerator pedal 226, and a brake pedal 228. In the present embodiment, the instrument panel 240 includes a mechanical instrument 242, a mechanical switch 244, and a display device 250. In the present embodiment, for example, an instrument image 252 and a switch image 254 are displayed on the display device 250.

In the present embodiment, the driving device 220 is configured to receive a user's operation on the vehicle 100. The user operates the steering wheel 222, so that a steering amount of the vehicle 100 is input. The user operates the paddle shift 224, so that a setting relating to a magnitude of the braking force by regeneration of the vehicle 100 is changed. The user operates the accelerator pedal 226, so that an acceleration operation amount of the vehicle 100 is input. The user operates the brake pedal 228, so that a braking operation amount of the vehicle 100 is input.

In the present embodiment, diverse switches for receiving the user's instruction or operation are arranged on the instrument panel 240. A variety of instruments for presenting the user with the state of the vehicle 100 are also arranged on the instrument panel 240.

The mechanical instrument 242 is configured to indicate the state of the vehicle 100 by a mechanical mechanism. The mechanical switch 244 is configured to receive the user's instruction or operation by a mechanical mechanism. The instrument image 252 may be a digital image functioning as any type of an instrument configured to indicate the state of the vehicle 100. The switch image 254 may be a digital image functioning as a switch for receiving the user's instruction or operation.

Note that, (i) each of the mechanical instrument 242 and the instrument image 252 may individually present the user with the information indicative of the state of the vehicle 100, or (ii) a combination of the mechanical instrument 242 and the instrument image 252 may present the user with the information indicative of the state of the vehicle 100. In addition, (i) each of the mechanical switch 244 and the switch image 254 may individually receive the user's instruction or operation or (ii) a combination of the mechanical switch 244 and the switch image 254 may receive the user's instruction or operation.

As the display device 250, any display device such as a liquid crystal display, an organic EL display and a projector can be used. The display device 250 may have a transmission type display or a non-transmission type display. The display device 250 may also be a head up display configured to display an image on a transmission type screen.

The driving device 220 may be an example of the input unit. Each of the steering wheel 222, the paddle shift 224, the accelerator pedal 226 and the brake pedal 228 may be an example of the input unit. The instrument panel 240 may be an example of the instrument or the input unit. The mechanical instrument 242 may be an example of the instrument. The mechanical switch 244 may be an example of the input unit. The display device 250 may be an example of the instrument or the input unit. The display device 250 may also be an example of the display device mounted on the moving body. The instrument image 252 may be an example of the instrument. The instrument image 252 may be an example of the image that constitutes at least a part of the instrument mounted on the moving body. The switch image 254 may be an example of the input unit.

In the present embodiment, the input/output system 120 has been described in detail with reference to the example where the driving device 220 and the instrument panel 240 receive the user's instruction or operation. However, the input/output system 120 is not limited to the present embodiment. In another embodiment, a voice input device, a gesture input device, a visual line input device and the like can be used as the input/output system 120.

Figure 3:
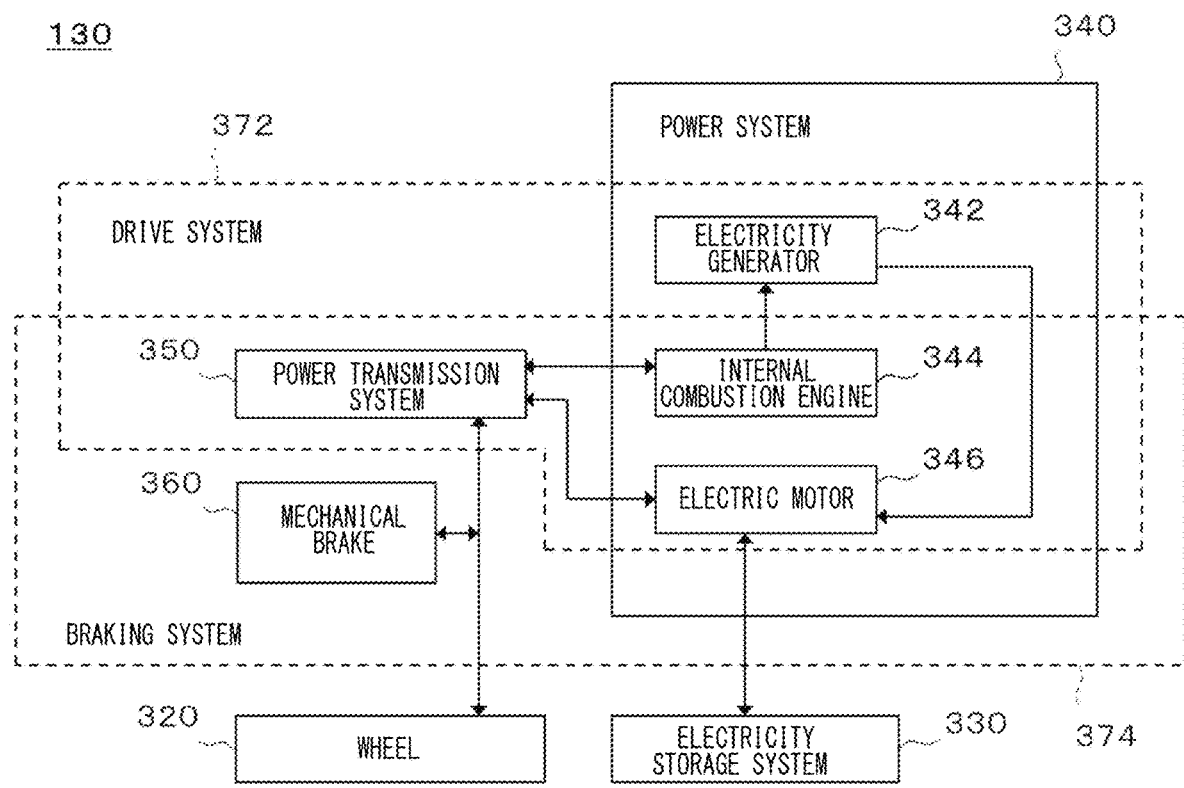
FIG. 3 schematically shows an example of an internal configuration of a vehicle motion system 130.

FIG. 3 schematically shows an example of an internal configuration of the vehicle motion system 130. In the present embodiment, the vehicle motion system 130 includes wheels 320, an electricity storage system 330, a power system 340, a power transmission system 350, and a mechanical brake 360. In the present embodiment, the power system 340 includes an electricity generator 342, an internal combustion engine 344, and an electric motor 346.

In the present embodiment, the electricity generator 342, the internal combustion engine 344, the electric motor 346 and the power transmission system 350 may constitute a part of a drive system 372 configured to drive the vehicle 100. In the present embodiment, the internal combustion engine 344, the electric motor 346, the power transmission system 350 and the mechanical brake 360 may also constitute a part of a braking system 374 configured to brake the vehicle 100. As shown in FIG. 3, in the present embodiment, at least a part of the drive system 372 functions as the braking system 374.

In the present embodiment, the wheels 320 are configured to rotate by a drive force transmitted from the power transmission system 350. The rotating speed of the wheels 320 is lowered by a braking force transmitted from the power transmission system 350.

In the present embodiment, the electricity storage system 330 is configured to store the electric energy. The electricity storage system 330 may also be configured to store the electric energy by electric power that is supplied from an external charging facility. The electricity storage system 330 may also be configured to store the electric energy by regenerative electric power that is supplied from the electric motor 346. In the present embodiment, the electricity storage system 330 is configured to supply the electric energy stored in the electricity storage system 330 to the electric motor 346. The electricity storage system 330 includes, for example, a battery, an inverter, a controller, and the like.

In the present embodiment, the power system 340 is configured to generate the drive force for the vehicle 100. The power system 340 may also be configured to generate the drive force for the vehicle 100 by mixing outputs of the internal combustion engine 344 and the electric motor 346 with any ratio. For example, the power system 340 may be configured to mix outputs of the internal combustion engine 344 and the electric motor 346 with a ratio determined by an operation mode of the vehicle 100. Note that, the vehicle 100 may be driven by an output from any one of the internal combustion engine 344 and the electric motor 346, depending on the operation mode of the vehicle 100.

In the present embodiment, the power system 340 is configured to generate the braking force by regeneration. The power system 340 may also be configured to generate the braking force for the vehicle 100 by mixing a braking force by an engine brake of the internal combustion engine 344 and a braking force by regeneration of the electric motor 346 with any ratio. For example, the power system 340 may be configured to mix the braking forces of the internal combustion engine 344 and the electric motor 346 with a ratio determined by the operation mode of the vehicle 100. Note that, the vehicle 100 may be braked by the braking force from any one of the internal combustion engine 344 and the electric motor 346, depending on the operation mode of the vehicle 100.

In the present embodiment, the electricity generator 342 is configured to generate electricity by using the internal combustion engine 344. The electricity generator 342 may also be configured to supply the generated electric power to the electric motor 346.

In the present embodiment, the internal combustion engine 344 is configured to convert chemical energy of fuel into the kinetic energy of the vehicle 100. Thereby, the drive force for the vehicle 100 is generated. The internal combustion engine 344 is also configured to generate the braking force by the engine brake.

In the present embodiment, the electric motor 346 is configured to convert the electric energy supplied as a result of discharging of the electricity storage system 330 into the kinetic energy of the vehicle 100. Thereby, the drive force for the vehicle 100 is generated. The electric motor 346 may also be configured to receive the electric power supplied from the electricity generator 342, and to generate the drive force for the vehicle 100.

The electric motor 346 is also configured to generate the braking force by a regenerative brake. The electric motor 346 may be configured to charge the electricity storage system 330 by the regenerative electric power generated as a result of the conversion of the kinetic energy of the vehicle 100 into the electrical energy.

In the present embodiment, the power transmission system 350 is configured to transmit the drive force generated by the power system 340 to the wheels 320. Examples of the power transmission system 350 includes a transmission, a shaft, a belt and a combination thereof.

In the present embodiment, the mechanical brake 360 is configured to generate the braking force. Examples of the mechanical brake 360 include a mechanical brake, a hydraulic brake, an air pressure brake, an air-hydraulic hybrid brake, an exhaust brake, and the like. The mechanical brake 360 may also be configured to generate the braking force by cooperating with the power system 340.

For example, the control system 150 is configured to determine the braking force by the power system 340 and the braking force by the mechanical brake 360, based on a setting relating to a magnitude of the braking force by regeneration set by the paddle shift 224 and a braking operation amount input from the brake pedal 228. The power system 340 and the mechanical brake 360 are configured to generate the braking force, in response to an instruction from the control system 150. Thereby, the power system 340 and the mechanical brake 360 can generate the braking force in cooperation with each other.

The electric motor 346 may be an example of the drive unit. The electric motor 346 may also be an example of the braking unit. The mechanical brake 360 may be an example of the braking unit. The drive system 372 may be an example of the drive unit. The braking system 374 may be an example of the braking unit.

Figure 4:
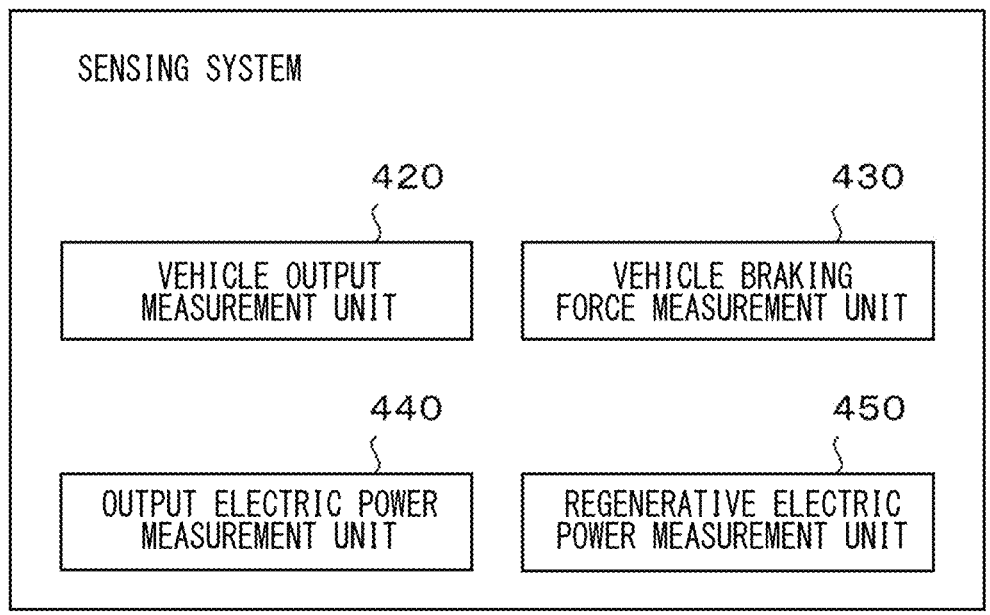
FIG. 4 schematically shows an example of an internal configuration of a sensing system 140.

FIG. 4 schematically shows an example of an internal configuration of the sensing system 140. In the present embodiment, the sensing system 140 includes a vehicle output measurement unit 420, a vehicle braking force measurement unit 430, an output electric power measurement unit 440, and a regenerative electric power measurement unit 450.

In the present embodiment, the vehicle output measurement unit 420 is configured to measure the drive force for the vehicle 100. For example, the vehicle output measurement unit 420 is configured to measure the drive force for the vehicle 100, based on torques and number of revolutions of the wheels 320. The vehicle output measurement unit 420 may also be configured to measure the drive force for the vehicle 100, based on an amount of work of the power system 340. The drive force may also be calculated as a sum of an amount of work of the internal combustion engine 344 and an amount of work of the electric motor 346. Note that, as described above, the vehicle 100 may be driven by an output from any one of the internal combustion engine 344 and the electric motor 346, depending on the operation mode of the vehicle 100.

In the present embodiment, the vehicle braking force measurement unit 430 is configured to measure the braking force for the vehicle 100. For example, the vehicle braking force measurement unit 430 is configured to measure an amount of braking for the vehicle 100, based on an amount of braking of the power system 340 and an amount of work of the mechanical brake 360. The vehicle braking force measurement unit 430 may also be configured to measure an amount of braking force for the vehicle 100, based on the braking force of the power system 340 and an estimated braking force by a depression force on the brake pedal 228. The braking force may also be calculated as a sum of the braking force by the engine brake of the internal combustion engine 344, the braking force by the regenerative brake of the electric motor 346, and the braking force of the mechanical brake 360. Note that, as described above, the vehicle 100 may be braked by the braking force from any one of the internal combustion engine 344 and the electric motor 346, depending on the operation mode of the vehicle 100.

In the present embodiment, the output electric power measurement unit 440 is configured to measure at least one of a magnitude[kw] and an amount of electric power[kwh] of electric power that is supplied from the electricity storage system 330 to the electric motor 346. The output electric power measurement unit 440 may associate and record a time and at least one of a voltage value and a current value at the time.

In the present embodiment, the regenerative electric power measurement unit 450 is configured to measure at least one of a magnitude[kw] and an amount of regenerative electric power[kwh] of regenerative electric power that is supplied from the electric motor 346 to the electricity storage system 330. The regenerative electric power measurement unit 450 may also be configured to measure an amount of current [A] of regenerative current.

Figure 5:
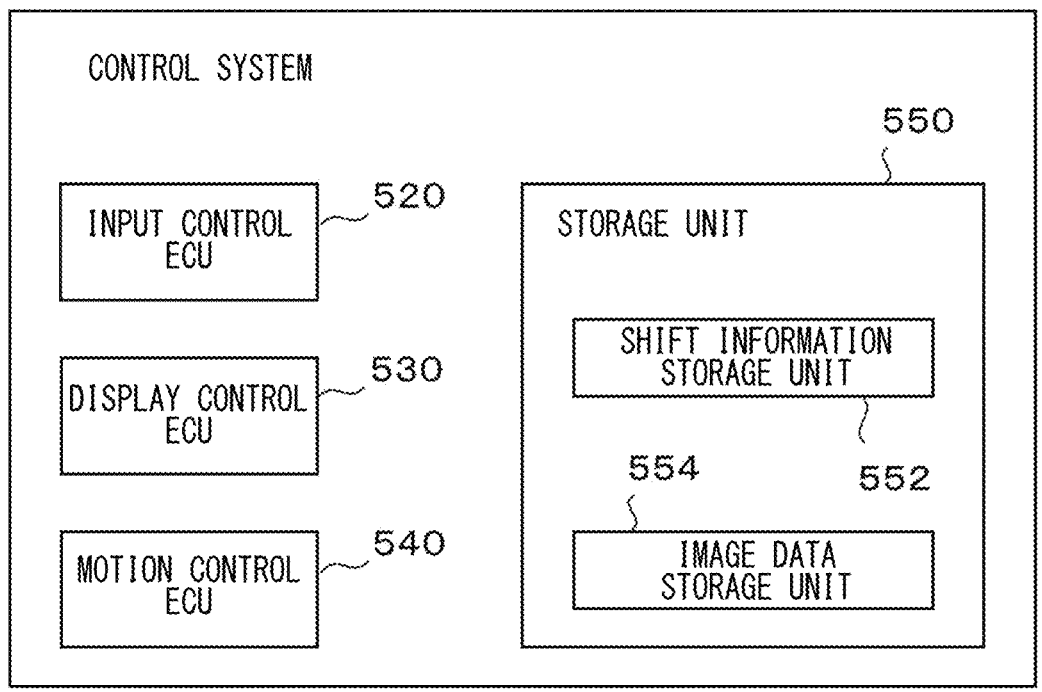
FIG. 5 schematically shows an example of an internal configuration of a control system 150.

FIG. 5 schematically shows an example of an internal configuration of the control system 150. In the present embodiment, the control system 150 includes an input control ECU 520, a display control ECU 530, a motion control ECU 540, and a storage unit 550. In the present embodiment, the storage unit 550 includes a shift information storage unit 552, and an image data storage unit 554.

In the present embodiment, the input control ECU 520 is configured to control information input to the control system 150. For example, the input control ECU 520 is configured to acquire, from the input/output system 120, information (also referred to as input information) indicative of a user's instruction or operation received by the input/output system 120. The input control ECU 520 may also be configured to acquire, from the sensing system 140, information indicative of a measurement result of a physical quantity relating to the state of the vehicle 100 measured by the sensing system 140. The input control ECU 520 will be described in detail later.

In the present embodiment, the display control ECU 530 is configured to control at least one of the mechanical instrument 242 and the display device 250. The display control ECU 530 may be configured to control information display on the mechanical instrument 242 or control information display on the display device 250. The display control ECU 530 may also be configured to control an operation of a pointer for indicating a value of an index relating to the state of the vehicle 100, in the mechanical instrument 242. The display control ECU 530 may also be configured to control at least one of a display content and a display aspect of the instrument image 252, in the display device 250.

For example, the display control ECU 530 is configured to acquire, from the input control ECU 520, a variety of information about the state of the vehicle 100. The display control ECU 530 is configured to determine values of diverse indexes relating to the state of the vehicle 100, based on the information acquired by the input control ECU 520. For example, the display control ECU 530 is configured to calculate values of diverse indexes relating to the state of the vehicle 100 from the information acquired by the input control ECU 520, based on predetermined calculation equations, functions or algorithms.

The display control ECU 530 may be configured to control display of at least one of the mechanical instrument 242 and the display device 250, based on the values of the diverse indexes. For example, the display control ECU 530 causes at least one of the mechanical instrument 242 and the display device 250 to display present values of the diverse indexes. When information about diverse settings relating to the vehicle 100 is included in the information acquired by the input control ECU 520, the display control ECU 530 may cause at least one of the mechanical instrument 242 and the display device 250 to display information indicative of contents of the settings. The instrument display that is controlled by the display control ECU 530 will be described in detail later.

More specifically, in the present embodiment, the display control ECU 530 is configured to acquire, from the input control ECU 520, information (which may also be referred to as drive information) about at least one of the output energy amount and the regenerative energy amount of the vehicle motion system 130. The display control ECU 530 may be configured to acquire information about the drive force that is generated by the vehicle motion system 130, as the information about the output energy amount of the vehicle motion system 130. The display control ECU 530 may be configured to acquire information about the regenerative electric power that is generated by the electric motor 346, as the information about the regenerative energy amount of the vehicle motion system 130.

In the present embodiment, the display control ECU 530 is also configured to acquire, from the input control ECU 520, information (which may also be referred to as braking information) about the braking force of the vehicle motion system 130. The display control ECU 530 may be configured to acquire information about the braking force by regeneration of the vehicle motion system 130, as the braking information. Examples of the information about the braking force by regeneration include at least one of (i) information indicative of a present setting of a plurality of settings relating to the braking force by regeneration of the vehicle motion system 130 and (ii) information indicative of a present value of the braking force by regeneration of the vehicle motion system 130.

In the present embodiment, the display control ECU 530 is configured to determine a present value of an index (which may also be referred to as an output index) relating to the output energy amount of the vehicle motion system 130, based on the drive information acquired from the input control ECU 520. For example, the display control ECU 530 is configured to calculate a value of an output ratio [%] based on a maximum amount of work of the power system 340, as the output index. More specifically, the display control ECU 530 is configured to calculate a value of the output ratio [%] based on a present amount of work of the power system 340 by dividing the present amount of work [kW] of the power system 340 by the maximum amount of work [kW] of the power system 340, for example.

Examples of the output index also include an output ratio [%] based on a maximum output that is obtained when the power system 340 drives the vehicle 100 in an operation mode (which may also be referred to as an EV traveling mode, a battery traveling mode or the like) in which the electricity storage system 330 solely supplies the electric power to the electric motor 346. The display control ECU 530 is configured to calculate the output ratio by dividing a present amount of work [kW] of the electricity storage system 330 by a maximum amount of work [kW] of the electricity storage system 330, for example.

In the present embodiment, the display control ECU 530 is configured to determine a present value of an index (which may also be referred to as a regeneration index) relating to the regenerative energy amount of the vehicle motion system 130, based on the drive information acquired from the input control ECU 520. For example, the display control ECU 530 is configured to calculate a value of a regenerative electric power ratio [%], as the regeneration index. The regenerative electric power ratio indicates a ratio of a present regenerative output [kW] to a maximum regenerative electric power [kW] of the electricity storage system 330. More specifically, the display control ECU 530 is configured to calculate a value of the regenerative electric power ratio [%] by dividing the present value [kw] of the regenerative electric power supplied from the electric motor 346 to the electricity storage system 330 by the maximum regenerative electric power [kW] of the electricity storage system 330, for example.

Examples of the regeneration index also include (i) a present value of an SOC of the electricity storage system 330, (ii) diverse indexes relating to an amount of change in SOC of the electricity storage system 330 before and after regeneration, and the like. The indexes relating to an amount of change in SOC of the electricity storage system 330 before and after regeneration may include a ratio of an amount of change in SOC of the electricity storage system 330 before and after regeneration to an SOC of the electricity storage system 330 before regeneration.

In the present embodiment, the display control ECU 530 is configured to determine a present value of an index (which may also be referred to as a braking index) relating to the braking force of the vehicle motion system 130, based on the drive information acquired from the input control ECU 520. The braking index may be an index indicating a level of the braking force that is generated by the vehicle motion system 130. For example, when the user releases the accelerator pedal 226 during traveling of the vehicle 100, the display control ECU 530 calculates a value of a level (which may also be referred to as deceleration) at which the vehicle 100 slows down, as the braking index. More specifically, the display control ECU 530 is configured to calculate a value of deceleration by summing the braking forces based on the paddle shift 224 and the shift information storage unit 552, etc. and the braking force based on the brake pedal 228, for example.

The display control ECU 530 may also be configured to determine a value of deceleration, based on a present setting relating to the braking force by regeneration for the vehicle 100. For example, in the shift information storage unit 552, each of a plurality of settings relating to the braking force by regeneration for the vehicle 100 is stored in association with a value of deceleration when the setting is selected. The display control ECU 530 can acquire a value of deceleration corresponding to a present setting indicated by the braking information with reference to the information stored in the shift information storage unit 552.

When a predetermined condition is satisfied, the display control ECU 530 may limit the value of deceleration corresponding to the present setting indicated by the braking information. Examples of the predetermined condition include a condition that the user depresses the accelerator pedal 226, a condition that a deceleration of the vehicle 100 is smaller than a predetermined value, a condition that the braking force generated by the vehicle motion system 130 is smaller than a predetermined value, and the like.

In one embodiment, when the user softly depresses the accelerator pedal 226, the display control ECU 530 may determine, as the present value of the deceleration, a value smaller than a value indicated by the present setting indicated by the braking information. In another embodiment, in a case where the speed of the vehicle 100 is relatively small, the deceleration of the vehicle 100 may become smaller than a predetermined value or the braking force generated by the vehicle motion system 130 may become smaller than a predetermined value. In this case, the display control ECU 530 may determine, as the present value of the deceleration, a value smaller than a value indicated by the present setting indicated by the braking information.

Examples of the braking index also include a deceleration ratio. The deceleration ratio is calculated by dividing a present deceleration of the vehicle 100 by a maximum value (which may also be referred to as a maximum deceleration for display) of a level of the braking force by regeneration set for display control, for example.

In the present embodiment, the motion control ECU 540 is configured to control motion of the vehicle 100. The motion control ECU 540 may also be configured to control motion of the vehicle 100 by controlling the vehicle motion system 130 based on the input information acquired from the input control ECU 520.

In the present embodiment, a variety of information is stored in the storage unit 550. A variety of information that is used in the information processing in the control system 150 may also be stored in the storage unit 550. A variety of information that is generated in the information processing in the control system 150 may also be stored in the storage unit 550.

In the present embodiment, a variety of information relating to a setting of the paddle shift 224 is stored in the shift information storage unit 552. For example, in the shift information storage unit 552, each of a plurality of settings relating to the braking force by regeneration for the vehicle 100 is stored in association with a value of deceleration when the setting is selected.

In the shift information storage unit 552, information indicative of relations among the plurality of settings may also be stored. For example, when a specific setting is selected, information relating to other settings that the user can select is stored in the shift information storage unit 552. Note that, the plurality of settings may include a setting corresponding to a case where the paddle shift 224 is not operated as well as a setting corresponding to a case where the paddle shift 224 is operated.

In the image data storage unit 554, a variety of image data that is used in the information processing in the display control ECU 530 are stored. For example, in the image data storage unit 554, information about a variety of objects that are used for the display control ECU 530 to generate the instrument image 252 is stored. Examples of the object include (i) an icon of a dashboard, (ii) icons arranged on or around the dashboard so as to indicate present states of the diverse indexes, (iii) icons arranged on or around the dashboard so as to indicate present states of the diverse settings, and the like.

The present states of the diverse settings may include a state (which may also be referred to as a rejection state) of rejecting receiving an instruction or input. Examples of the rejection state include a state of rejecting receiving an instruction or input for shifting to an EV priority mode, a state of rejecting receiving an instruction or input for shifting to a specific stage of a speed reduction selector, and the like.

The input control ECU 520 may be an example of the input information acquisition unit, the drive information acquisition unit or the braking information acquisition unit. The display control ECU 530 may be an example of the control device, the input information acquisition unit, the drive information acquisition unit, the braking information acquisition unit or the display control unit.

Figure 6:
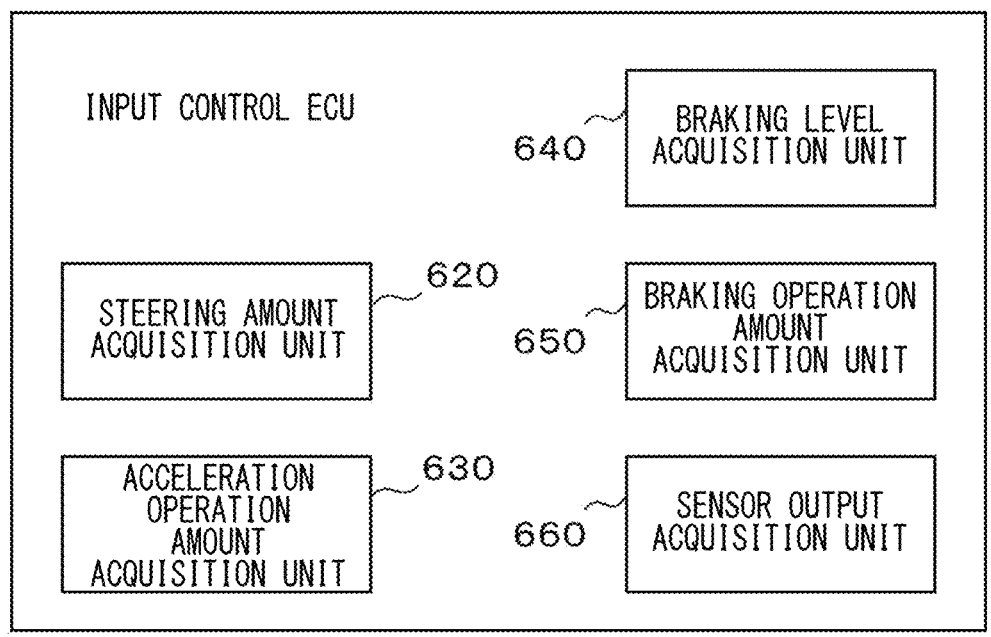
FIG. 6 schematically shows an example of an internal configuration of an input control ECU 520.

FIG. 6 schematically shows an example of an internal configuration of the input control ECU 520. In the present embodiment, the input control ECU 520 includes a steering amount acquisition unit 620, an acceleration operation amount acquisition unit 630, a braking level acquisition unit 640, a braking operation amount acquisition unit 650, and a sensor output acquisition unit 660.

In the present embodiment, the steering amount acquisition unit 620 is configured to acquire information indicative of a steering amount received by the steering wheel 222. In the present embodiment, the acceleration operation amount acquisition unit 630 is configured to acquire information indicative of an acceleration operation amount received by the accelerator pedal 226. In the present embodiment, the braking level acquisition unit 640 is configured to acquire information indicative of a content or change of a setting relating to a magnitude of the braking force by regeneration received by the paddle shift 224. For example, the braking level acquisition unit 640 is configured to acquire information indicative of a present setting of a plurality of settings relating to the magnitude of the braking force by regeneration. In the present embodiment, the braking operation amount acquisition unit 650 is configured to acquire information indicative of a braking operation amount received by the brake pedal 228.

In the present embodiment, the sensor output acquisition unit 660 is configured to acquire information indicative of measurement results of a variety of physical quantities from the sensing system 140. For example, the sensor output acquisition unit 660 is configured to acquire information indicative of a measurement result on at least one of the output energy amount and the regenerative energy amount of the vehicle motion system 130. The sensor output acquisition unit 660 may also be configured to acquire information indicative of a measurement result on the braking force of the vehicle motion system 130. The sensor output acquisition unit 660 may also be configured to acquire information indicative of a measurement result on the braking force by regeneration of the vehicle motion system 130.

The steering amount acquisition unit 620 may be an example of the input information acquisition unit. The acceleration operation amount acquisition unit 630 may be an example of the input information acquisition unit. The braking level acquisition unit 640 may be an example of the input information acquisition unit or the braking information acquisition unit. The braking operation amount acquisition unit 650 may be an example of the input information acquisition unit. The sensor output acquisition unit 660 may be an example of the drive information acquisition unit or the braking information acquisition unit. The information indicative of the content or change of the setting relating to the magnitude of the braking force by regeneration may be an example of the first braking information. The information indicative of the measurement result on the braking force of the vehicle motion system 130 may be an example of the second braking information.

An example of the details of the instrument image 252 and the details of the control on the instrument by the display control ECU 530 are described with reference to FIGS. 7, 8, 9, 10, 11 and 12. An example of the instrument image 252 for presenting the user with the output energy amount and the regenerative energy amount of the vehicle motion system 130 is described with reference to FIGS. 7, 8 and 9. An example of the instrument image 252 for presenting the user with the output energy amount and the level of the braking force by regeneration of the vehicle motion system 130 is described with reference to FIG. 10. An example of a display aspect of the output energy amount and the regenerative energy amount of the vehicle motion system 130 is described with reference to FIG. 11. An example of a display aspect of the output energy amount and the level of the braking force by regeneration of the vehicle motion system 130 is described with reference to FIG. 12.

Figure 7:
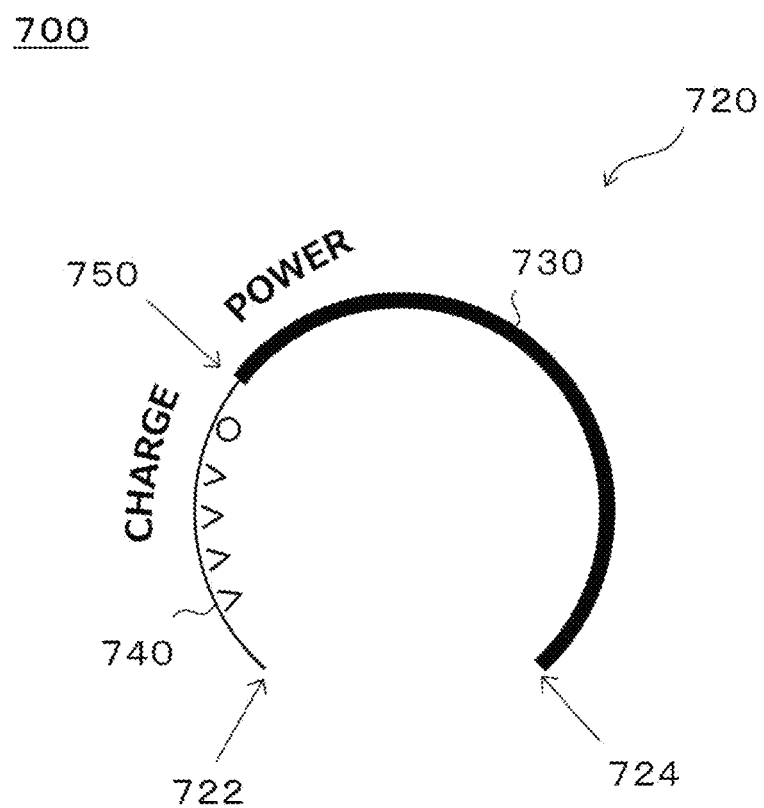
FIG. 7 schematically shows an example of a dashboard image 700.
Figure 8:
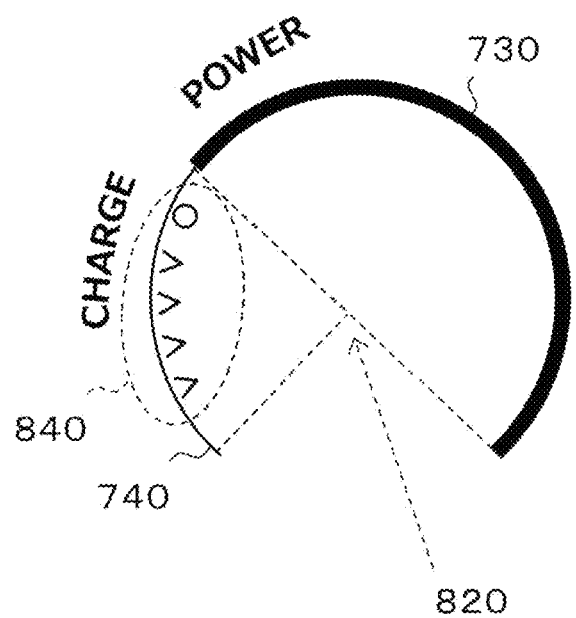
FIG. 8 schematically shows an example of the dashboard image 700.

FIGS. 7 and 8 schematically show an example of a dashboard image 700. In the present embodiment, the dashboard image 700 constitutes a part of the instrument image 252. The dashboard image 700 may be a digital image.

As shown in FIG. 7, in the present embodiment, the dashboard image 700 has a scale object 720. A partial region of the scale object 720 is formed with an output region 730. A region different from the output region 730 of the scale object 720 is formed with a regeneration region 740.

According to the present embodiment, the output region 730 and the regeneration region 740 are arranged adjacent to each other on the scale object 720. The output region 730 is arranged on an end portion 724-side of the scale object 720, and the regeneration region 740 is arranged on an end portion 722-side of the scale object 720. A boundary 750 between the output region 730 and the regeneration region 740 is expressed so that the user can visually recognize the boundary 750.

In the present embodiment, the scale object 720 has a function as a gauge. For example, a guideline for present values of the diverse indexes displayed on the instrument image 252 is presented to the user by a position on the scale object 720.

In the present embodiment, the scale object 720 has a line shape or band shape that is continuously visually recognized. As shown in FIG. 8, in the present embodiment, the scale object 720 has an arc shape whose center is a center 820.

Note that, the scale object 720 may have a solid line shape or diverse dotted line shapes. The scale object 720 may have a straight line shape or a curved line shape. The scale object 720 may have substantially a conical curve shape or spiral shape or a shape where the conical curve shape or spiral shape is partially included. Examples of the conical curve shape include a circle, an arc, an ellipse, an elliptical arc, and the like.

In the present embodiment, a present value of the output index determined by the display control ECU 530 is presented in the output region 730. The present value of the output index is indicated by a position on the output region 730. For example, a level of the present value of the output index with respect to an upper limit value and a lower limit value on the display of the output index is indicated by a position on the output region 730.

In the present embodiment, a present value of the regeneration index determined by the display control ECU 530 is presented in the regeneration region 740. The present value of the regeneration index is indicated by a position on the regeneration region 740. For example, a level of the present value of the regeneration index with respect to an upper limit value and a lower limit value on the display of the regeneration index is indicated by a position on the regeneration region 740.

In the present embodiment, the boundary 750 indicates a lower limit value on the display of the output index on the scale object 720. The boundary 750 also indicates a lower limit value on the display of the regeneration index on the scale object 720. That is, according to the present embodiment, a position of the lower limit value on the display of the output index coincides with a position of the lower limit value on the display of the regeneration index. Note that, the end portion 724 indicates an upper limit value on the display of the output index on the scale object 720. The end portion 722 indicates an upper limit value on the display of the regeneration index on the scale object 720.

In the present embodiment, the output index and the regeneration index are determined based on the present amount of work [kW] of the power system 340. A position of the lower limit value on the display of the output index and a position of the lower limit value on the display of the regeneration index on the scale object 720 coincide with each other, so that transition between drive and braking states of the vehicle 100 can be continuously expressed.

According to the present embodiment, a length of the output region 730 is set longer than a length of the regeneration region 740. Thereby, the user's visibility is improved.

The dashboard image 700 may be an example of the digital image. The scale object 720 may be an example of the first object. The scale object 720 may be an example of the digital image. The center 820 may be an example of the focal point of the conical curve.

As shown in FIG. 8, in the dashboard image 700, a braking force level indicator 840 is arranged in a part of the regeneration region 740. The braking force level indicator 840 is constituted by a plurality of marks each indicating each of a plurality of settings relating to the braking force of the vehicle motion system 130. Each of the plurality of marks is arranged in the vicinity of a position corresponding to each setting in the regeneration region 740.

As described above, the vehicle motion system 130 may have a plurality of traveling modes in which the braking force or the deceleration to be applied to the vehicle 100 is different. The vehicle motion system 130 is configured to use one of the traveling modes, as a usual traveling mode. For example, the input control ECU 520 calculates or sets the braking force different from the usual traveling mode, based on the present setting input by the paddle shift 224, the shift information storage unit 552 and the instrument panel 240, so that the traveling mode of the vehicle 100 is changed to a traveling mode (which may also be referred to as a braking force change mode) different from the usual traveling mode.

In a case where the traveling mode of the vehicle 100 is the braking force change mode, the display control ECU 530 can change a display aspect of the braking force level indicator 840, based on the setting relating to the braking force input by the input control ECU 520. Thereby, the user can visually recognize the present setting relating to the braking force. The display aspect of the braking force level indicator 840 will be described in detail later.

Figure 9:
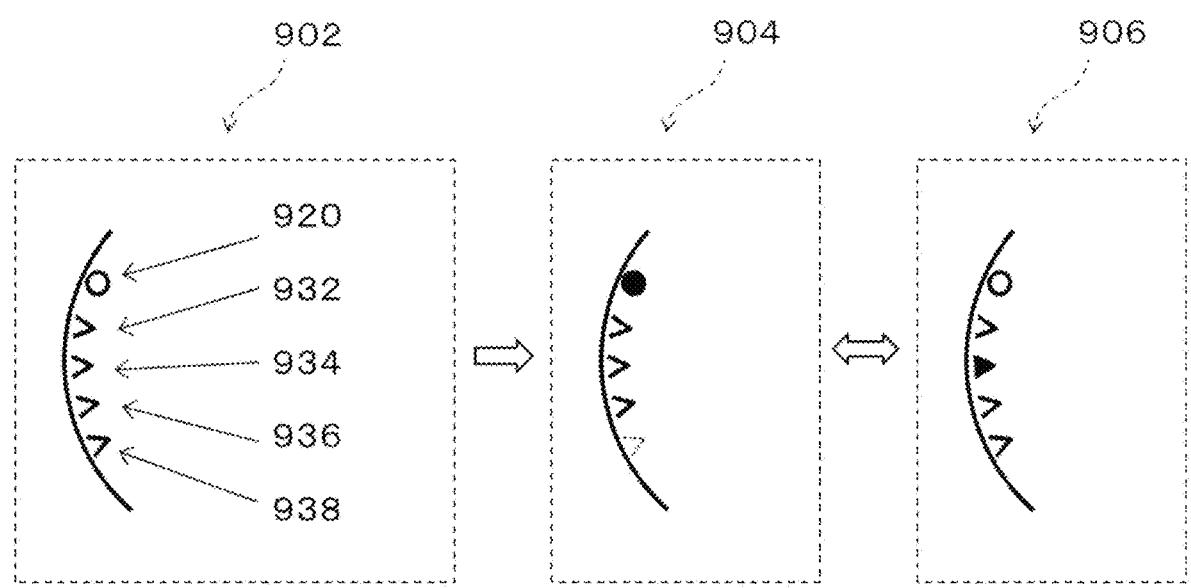
FIG. 9 schematically shows an example of a transition pattern of a braking force level indicator 840.

FIG. 9 schematically shows an example of a transition pattern of the braking force level indicator 840. In FIG. 9, an image 902 shows a basic display aspect of the braking force level indicator 840. The image 902 shows, for example, a display aspect of the braking force level indicator 840 in a CHARGE mode. An image 904 shows a display aspect of the braking force level indicator 840 in a state where the paddle shift 224, the shift information storage unit 552 and the instrument panel 240 are not operated. An image 906 shows a display aspect of the braking force level indicator 840 in a state where the paddle shift 224 is operated to select a specific setting.

As shown in the image 902, the braking force level indicator 840 includes a mark 920 indicating that the traveling mode of the vehicle 100 is not the braking force change mode, a mark 932 indicating that a weak braking force is applied when the user releases the accelerator pedal 226, a mark 934 indicating that a braking force stronger than that in the case of the mark 932 is applied, a mark 936 indicating that a braking force stronger than that in the case of the mark 934 is applied, and a mark 938 indicating that a braking force stronger than that in the case of the mark 936 is applied. As described above, each of the marks corresponds to each of the plurality of settings relating to the braking force by regeneration.

As shown in the image 904, in the state where the traveling mode of the vehicle 100 is not the braking force change mode, a color of the mark 920 corresponding to the state changes, as compared to the image 902. In the state where the traveling mode of the vehicle 100 is not the braking force change mode, a color of the mark 938 changes when the user cannot select a setting corresponding to the mark 938. Note that, the change in display aspect of the mark is not limited to the change in color. At least one of a color, a pattern, a shape and a magnitude of the mark may be changed or the mark may not be displayed.

The display control ECU 530 may control the display of at least one of the plurality of marks so that (i) at least one of a color, a pattern, a shape and a magnitude of a mark, which corresponds to a present setting relating to the braking force, of the plurality of marks and (ii) at least one of a color, a pattern, a shape and a magnitude of a mark, which corresponds to at least one setting other than the present setting, of the plurality of marks are different from each other. For example, the display control ECU 530 executes the processing when the traveling mode of the vehicle 100 is the braking force change mode.

As described above, the selection of the other settings may not be permitted, depending on the present setting. Therefore, the display control ECU 530 specifies one or more settings that the user is not permitted to select in the present setting by referring to the information stored in the shift information storage unit 552, for example. The display control ECU 530 may control the display of at least one of the plurality of marks so that (i) at least one of a color, a pattern, a shape and a magnitude of a mark, which corresponds to one or more settings that the user is not permitted to select, of the plurality of marks and (ii) at least one of a color, a pattern, a shape and a magnitude of a mark, which corresponds to at least one setting other than the one or more settings that the user is not permitted to select, of the plurality of marks are different from each other.

The mark 920 may be an example of the mark. The mark 932 may be an example of the mark. The mark 934 may be an example of the mark. The mark 936 may be an example of the mark. The mark 938 may be an example of the mark. The display control ECU 530 may be an example of the setting specifying unit.

In the present embodiment, the dashboard image 700 has been described in detail with reference to the example where the braking force level indicator 840 is displayed on the dashboard image 700 during the CHARGE mode. However, the dashboard image 700 is not limited to the present embodiment. In another embodiment, the braking force level indicator 840 may not be displayed on the dashboard image 700 during the CHARGE mode.

In the present embodiment, the transition pattern of the braking force level indicator 840 has been described in detail with reference to, as the example, the braking force level indicator 840 having the mark 920, the mark 932, the mark 934, the mark 936 and the mark 938. However, the shape of each element included in the braking force level indicator 840 and the transition pattern of the braking force level indicator 840 are not limited to the present embodiment. In another embodiment, each element included in the braking force level indicator 840 may have any shape. The braking force level indicator 840 may represent a transition of the braking force level or the mode by any pattern.

Figure 10:
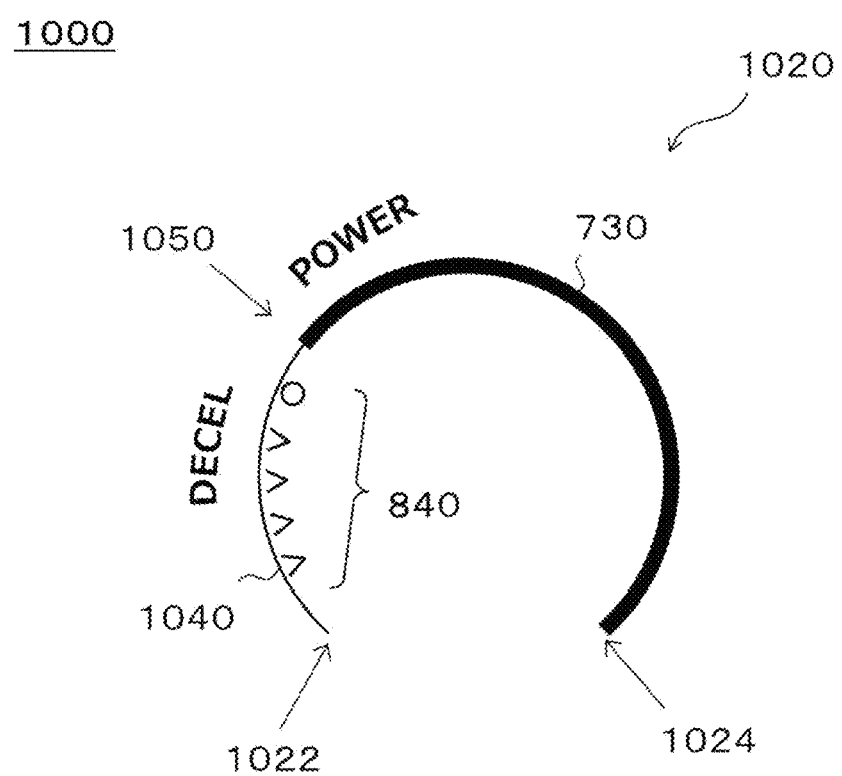
FIG. 10 schematically shows an example of a dashboard image 1000.

FIG. 10 schematically shows an example of a dashboard image 1000. In the present embodiment, the dashboard image 1000 constitutes a part of the instrument image 252. The dashboard image 1000 may be a digital image.

In the present embodiment, the dashboard image 1000 has a scale object 1020. A partial region of the scale object 1020 is formed with the output region 730. A region different from the output region 730 of the scale object 1020 is formed with a braking region 1040.

The dashboard image 1000 may have a similar configuration to the dashboard image 700, except that the braking region 1040 is formed instead of the regeneration region 740. The scale object 1020 may have a similar configuration to the scale object 720. An end portion 1022 corresponds to the end portion 722, an end portion 1024 corresponds to the end portion 724, and a boundary 1050 corresponds to the boundary 750.

For example, in a state where the display device 250 displays the dashboard image 700, when input information is input to the display control ECU 530 and an instruction or operation indicated by the input information is a predetermined first type of instruction or operation, the display control ECU 530 displays the dashboard image 1000 on the display device 250, instead of the dashboard image 700. Examples of the first type of instruction or operation include (i) an operation of designating a magnitude of the braking force by regeneration by the paddle shift 224 for example, (ii) an operation of changing a magnitude of the braking force by regeneration by input information from the shift information storage unit 552, (iii) an operation of changing a magnitude of the braking force by regeneration by input information from the instrument panel 240, and the like.

Thereby, the display control ECU 530 can display the braking region 1040 instead of the regeneration region 740 in a region different from the output region 730 of the scale object 720. At this time, the display control ECU 530 may also display information indicative of a name or a type of the braking region 1040, instead of information indicative of a name or a type of the regeneration region 740.

The information (for example, the character string "CHARGE" in FIG. 7) indicative of a name or a type of the regeneration region 740 may be arranged in the vicinity of the regeneration region 740. Similarly, the information (for example, the character string "DECEL" in FIG. 10) indicative of a name or a type of the braking region 1040 may be arranged in the vicinity of the braking region 1040. Note that, the position of the information indicative of a name or a type of the regeneration region 740 and the position of the information indicative of a name or a type of the braking region 1040 are not limited to the present embodiment. The information indicative of a name or a type of the regeneration region 740 and the information indicative of a name or a type of the braking region 1040 may be arranged at any positions.

Note that, in a state where the display device 250 displays the dashboard image 1000, when input information is input to the display control ECU 530 and an instruction or operation indicated by the input information is a predetermined second type of instruction or operation, the display control ECU 530 displays the dashboard image 700 on the display device 250, instead of the dashboard image 1000. Examples of the second type of instruction or operation include (i) an instruction or operation for releasing a designation relating to a magnitude of the braking force by regeneration, as an instruction or operation by the paddle shift 224, for example, (ii) an instruction or operation for accelerating the vehicle 100 or an instruction or operation for maintaining a speed of the vehicle 100, as an instruction or operation by the accelerator pedal 226, for example, (iii) an instruction or operation for releasing a designation relating to a magnitude of the braking force by regeneration, as an instruction or operation by the input information from the shift information storage unit 552, for example, (iv) an instruction or operation for releasing a designation relating to a magnitude of the braking force by regeneration, as an instruction or operation by the input information from the instrument panel 240, for example, and the like.

Thereby, the display control ECU 530 can display the regeneration region 740 instead of the braking region 1040 in a region different from the output region 730 of the scale object 720. At this time, the display control ECU 530 may also display information indicative of a name or a type of the regeneration region 740, instead of information indicative of a name or a type of the braking region 1040.

In the present embodiment, a present value of the braking index determined by the display control ECU 530 is presented in the braking region 1040. The present value of the braking index is indicated by a position on the braking region 1040. For example, a level of the present value of the braking index with respect to an upper limit value and a lower limit value on the display of the braking index is indicated by a position on the braking region 1040.

The dashboard image 1000 may be an example of the digital image. The scale object 1020 may be an example of the first object. The scale object 1020 may be an example of the digital image.

Figure 11:
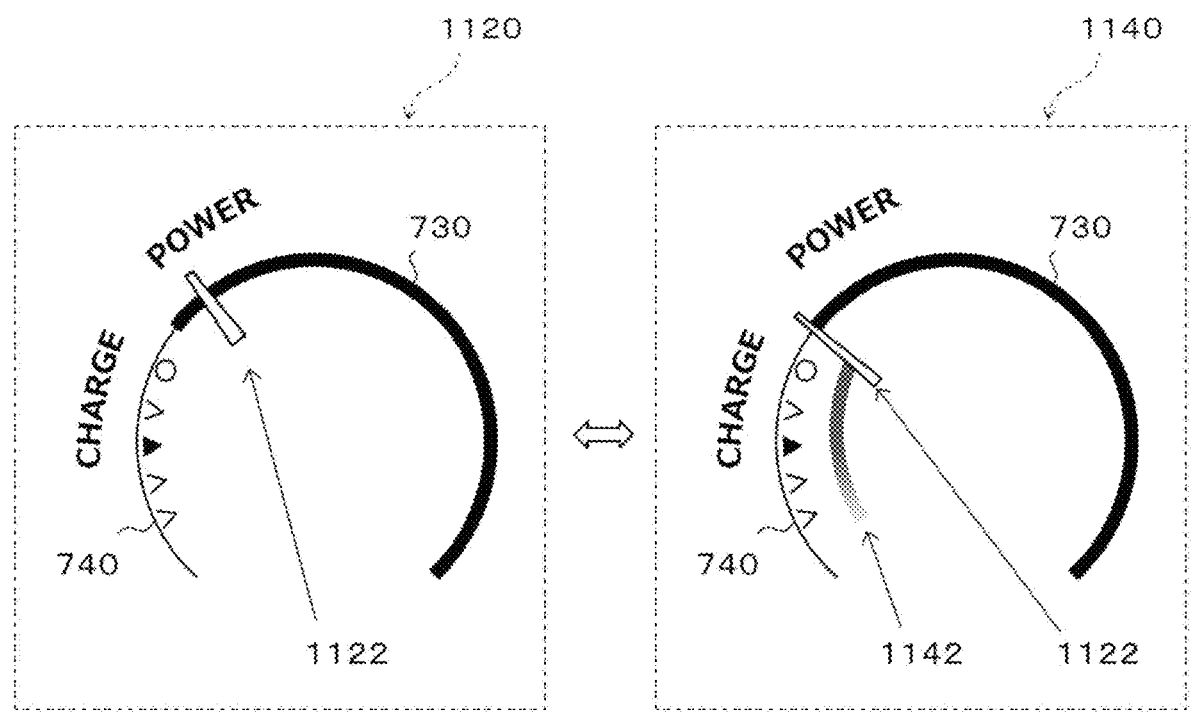
FIG. 11 schematically shows an example of a vehicle state display method using the dashboard image 700.

FIG. 11 schematically shows an example of a vehicle state display method using the dashboard image 700. In FIG. 11, an image 1120 shows the instrument image 252 in a state where the vehicle motion system 130 generates the drive force. An image 1140 shows the instrument image 252 in a state where the vehicle motion system 130 generates the braking force.

In the present embodiment, the image 1120 includes the dashboard image 700 and an output index object 1122. The output index object 1122 may be a digital image imitating a rotating pointer.

A level of the present value of the output index with respect to an upper limit value and a lower limit value on the display of the output index is indicated by a position on the output region 730 indicated by the output index object 1122. The display control ECU 530 generates the image 1120 so that a position indicated by the output index object 1122 changes according to a value of the output index determined by the display control ECU 530. Thereby, the display control ECU 530 can control the display of the output index object 1122, based on the output energy amount indicated by the drive information.

In the present embodiment, the output index object 1122 may be arranged on a line connecting (i) the arc center 820 of the scale object 720 and (ii) a position indicative of a present value of the output index on the output region. The output index object 1122 intersects with the scale object 720 at a position indicative of a present value of the output index on the output region 730. Thereby, at least a part of the output index object 1122 is arranged on an outer side of the arc of the scale object 720.

In the present embodiment, the image 1140 includes the dashboard image 700, and a regeneration index object 1142. The regeneration index object 1142 may be a digital image.

A level of the present value of the regeneration index with respect to an upper limit value and a lower limit value on the display of the regeneration index is indicated by a position on the regeneration region 740 indicated by the regeneration index object 1142. The display control ECU 530 generates the image 1140 so that a position indicated by the regeneration index object 1142 changes according to a value of the regeneration index determined by the display control ECU 530. Thereby, the display control ECU 530 can control the display of the regeneration index object 1142, based on the regenerative energy amount indicated by the drive information.

In the present embodiment, the regeneration index object 1142 has a band shape. The regeneration index object 1142 may expand and contract along the shape of the regeneration region 740, according to the present value of the regeneration index. The regeneration index object 1142 may indicate a level of the regenerative energy amount by a length of the regeneration index object 1142. The display control ECU 530 may control the display of the regeneration index object 1142 so that a length of the regeneration index object 1142 becomes a length corresponding to the present value of the regeneration index.

In the present embodiment, the regeneration index object 1142 is arranged at a position on the scale object 720 at which it does not overlap a part corresponding to the regeneration region 740. Thereby, the user's visibility is improved.

Note that, in a state where the image 1120 is displayed on the display device 250, the regenerative electric power is not supplied from the power transmission system 350 to the power system 340. In this case, for example, the present value of the regeneration index is equal to or smaller than the lower limit value on the display of the regeneration index. For this reason, the regeneration index object 1142 is not expressed on the image 1120.

That is, in the present embodiment, when the present value of the regeneration index is equal to or smaller than the lower limit value on the display of the regeneration index, the regeneration index object 1142 is not displayed on the display device 250. Thereby, the user's visibility is improved. In addition, the computer resources of the control system 150 can be prevented from wasting.

Note that, in a state where the image 1140 is displayed on the display device 250, the output electric power is not supplied from the power system 340 to the power transmission system 350. In this case, for example, the present value of the output index is equal to or smaller than the lower limit value on the display of the output index. However, on the image 1140, the output index object 1122 may be expressed so as to point a position indicating the lower limit value on the display of the output index in the dashboard image 700.

That is, in the present embodiment, when the present value of the output index is equal to or smaller than the lower limit value on the display of the output index, the output index object 1122 may be displayed on the display device 250 so that the output index object 1122 is to point a position indicating the lower limit value on the display of the output index in the instrument. Note that, the display control ECU 530 may display the output index object 1122 so that at least one of a color, a pattern, a shape and a magnitude of at least a part of the output index object 1122 is different (i) in a case where the present value of the output index indicated by the drive information is larger than the lower limit value on the display of the output index and (ii) in a case where the present value of the output index indicated by the drive information is equal to or smaller than the lower limit value on the display of the output index. Thereby, the user's visibility is improved.

As shown in the image 1120 and the image 1140, according to the present embodiment, the shape is different in the output index object 1122 and the regeneration index object 1142. According to the present embodiment, since a moving distance of each object is limited, the user's visibility is improved. According to the present embodiment, the regeneration index object 1142 has a band shape and a relatively large area on the display. Thereby, the user's visual recognition on the regeneration index is improved.

According to the present embodiment, at least a part of the output index object 1122 is arranged on an outer side of the arc of the scale object 720, and the regeneration index object 1142 is entirely arranged on an inner side of the arc of the scale object 720. Thereby, the user's visibility is improved.

The output index object 1122 may be an example of the second object. The regeneration index object 1142 may be an example of the third object. The outer side of the arc may be an example of one side in the direction substantially orthogonal to the extension direction of the scale object 720. The outer side of the arc may be an example of the other side in the direction substantially orthogonal to the extension direction of the scale object 720.

In the present embodiment, the example of the instrument has been described with reference to the case where the output index object 1122 and the regeneration index object 1142 are digital images. However, the instrument is not limited to the present embodiment. In another embodiment, at least one of the output index object 1122 and the regeneration index object 1142 may be a tangible entity. For example, the output index object 1122 may be a physical rotating pointer.

Figure 12:
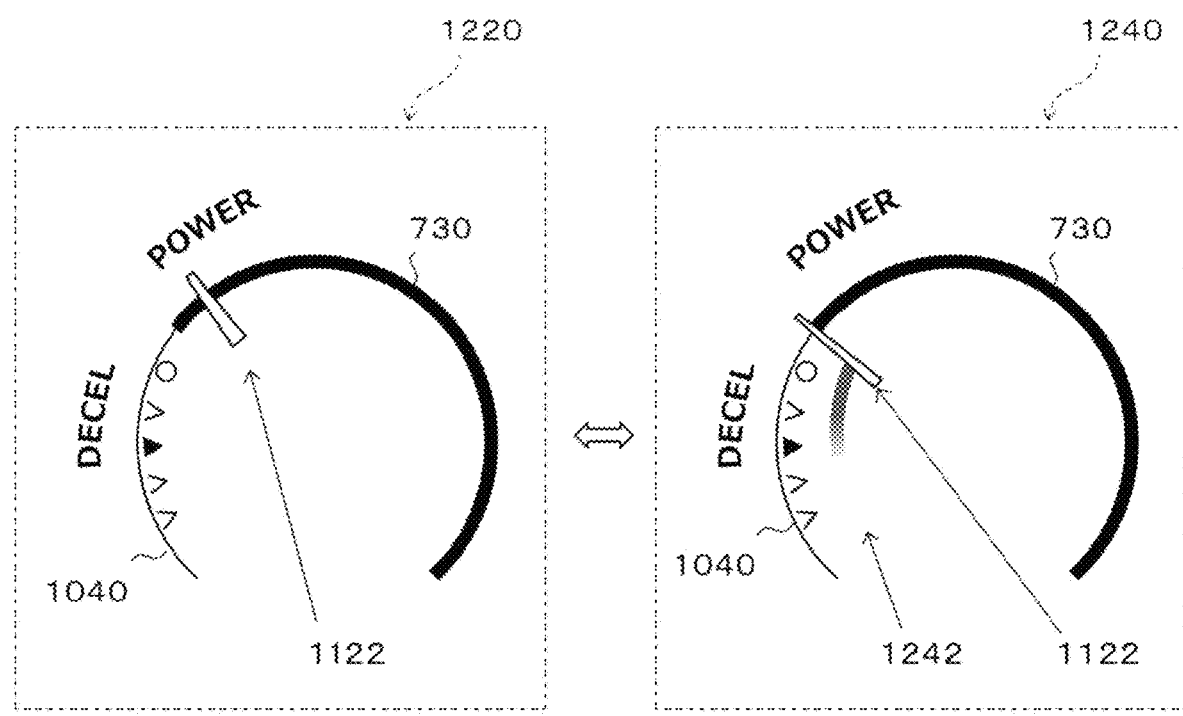
FIG. 12 schematically shows an example of a vehicle state display method using the dashboard image 1000.

FIG. 12 schematically shows an example of a vehicle state display method using the dashboard image 1000. In FIG. 12, an image 1220 shows the instrument image 252 in a state where the vehicle motion system 130 generates the drive force. An image 1240 shows the instrument image 252 in a state where the vehicle motion system 130 generates the braking force.

As described above, the image 1240 is displayed instead of the image 1140 when the predetermined first type of instruction or operation is executed. When the predetermined second type of instruction or operation is executed, the image 1140 is displayed instead of the image 1240. When the predetermined first type of instruction or operation is executed, the image 1220 is displayed instead of the image 1120. When the predetermined second type of instruction or operation is executed, the image 1120 is displayed instead of the image 1220.

In the present embodiment, the image 1220 includes the dashboard image 1000 and the output index object 1122. The image 1240 includes the dashboard image 1000 and a braking index object 1242. The braking index object 1242 may be a digital image.

A level of the present value of the braking index with respect to an upper limit value and a lower limit value on the display of the braking index is indicated by a position on the braking region 1040 indicated by the braking index object 1242. Thereby, the present value of the braking index can be presented to the user. The display control ECU 530 generates the image 1240 so that a position indicated by the braking index object 1242 changes according to a value of the braking index determined by the display control ECU 530. Thereby, the display control ECU 530 can control the display of the braking index object 1242, based on at least one of (i) the present setting relating to the braking force indicated by the braking information and (ii) the present value of the braking force indicated by the braking information.

In the present embodiment, the braking index object 1242 may have a similar configuration to the regeneration index object 1142. For example, the braking index object 1242 has a band shape. The braking index object 1242 expands and contracts along the shape of the braking region 1040, according to the present value of the braking index. The braking index object 1242 may indicate a level of the braking force by a length of the braking index object 1242.

The display control ECU 530 may control the display of the braking index object 1242 so that a length of the braking index object 1242 is to be a length corresponding to the present value of the braking index. For example, the display control ECU 530 controls the display of the braking index object 1242 so that a length of the braking index object 1242 is to be a length corresponding to the present setting relating to the braking force.

That is, in the present embodiment, when the paddle shift 224 is operated, a magnitude of the braking force by regeneration changes stepwise. For this reason, in a state where the braking force by the mechanical brake 360 is not applied, the length of the braking index object 1242 also changes stepwise. Specifically, the length of the braking index object 1242 is set to a length (i) from a position of the boundary 1050 (ii) to a position indicated by a mark, which corresponds to a setting designated by the paddle shift 224, of the plurality of marks included in the braking force level indicator 840.

Note that, in a state where the braking force by the mechanical brake 360 is applied, the control system 150 cooperatively controls the braking force by regeneration and the braking force by the mechanical brake 360, thereby generating a braking force having a level designated by the user via the brake pedal 228. For this reason, there is a possibility that a magnitude of the braking force applied to the vehicle 100 will be larger than a magnitude of the braking force set with the braking force change mode designated by the paddle shift 224. In this case, the display control ECU 530 may determine the length of the braking index object 1242 so that the length of the braking index object 1242 indicates a sum of the braking force by regeneration and the braking force by the mechanical brake 360.

The braking index object 1242 may also be arranged at a position similar to the regeneration index object 1142. For example, the braking index object 1242 may be arranged at a position at which it does not overlap the scale object 720.

Figure 13:
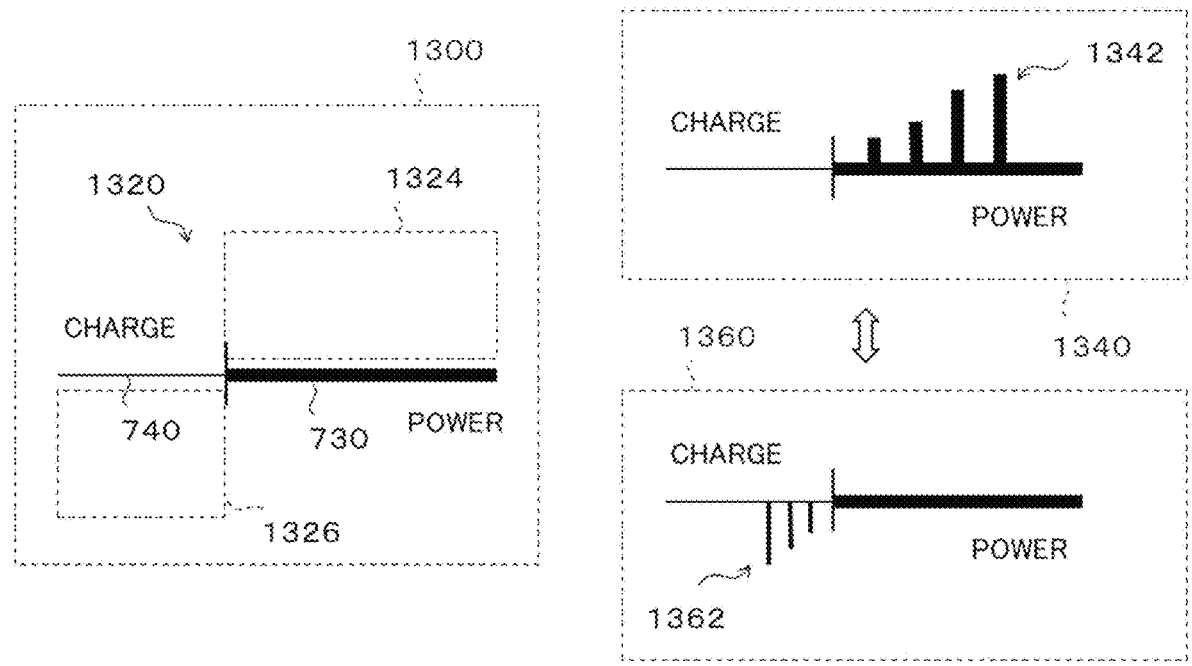
FIG. 13 schematically shows an example of a vehicle state display method using a dashboard image 1300.

FIG. 13 schematically shows an example of a vehicle state display method using a dashboard image 1300. In the present embodiment, the dashboard image 1300 has a scale object 1320. The dashboard image 1300 may be another example of the dashboard image 700. The scale object 1320 may be another example of the scale object 720.

In the dashboard image 700, the example of the scale object 720 has been described with reference to the case where the scale object 720 has an arc shape. Note that, the scale object 1320 is different from the scale object 720, in that it has a linear shape or a substantially linear shape. As regards the features except the difference, the scale object 1320 may have a similar configuration to the scale object 720. For example, in the scale object 1320, the output region 730 and the regeneration region 740 are arranged adjacent to each other.

In the dashboard image 1300, the output index object is displayed in a region 1324 arranged on one side in a direction substantially orthogonal to an extension direction of the scale object 1320. Similarly, the regeneration index object is displayed in a region 1326 arranged on the other side in the direction substantially orthogonal to the extension direction of the scale object 1320.

An image 1340 shows an example of the instrument image 252 in a state where an output index object 1342 is displayed in the region 1324 of the dashboard image 1300. Similarly, an image 1360 shows an example of the instrument image 252 in a state where a regeneration index object 1362 is displayed in the region 1326 of the dashboard image 1300.

In the present embodiment, the output index object 1342 is configured by one or more rod-shaped objects. The larger the value of the output index is, the larger the number of the rod-shaped objects is. The one or more rod-shaped objects are configured so that a length of an object arranged at a position at which a value of the output index is larger is longer.

In the present embodiment, the regeneration index object 1362 is configured by one or more rod-shaped objects. The larger the value of the regeneration index is, the larger the number of the rod-shaped objects is. The one or more rod-shaped objects are configured so that a length of an object arranged at a position at which a value of the regeneration index is larger is longer.

Figure 14:
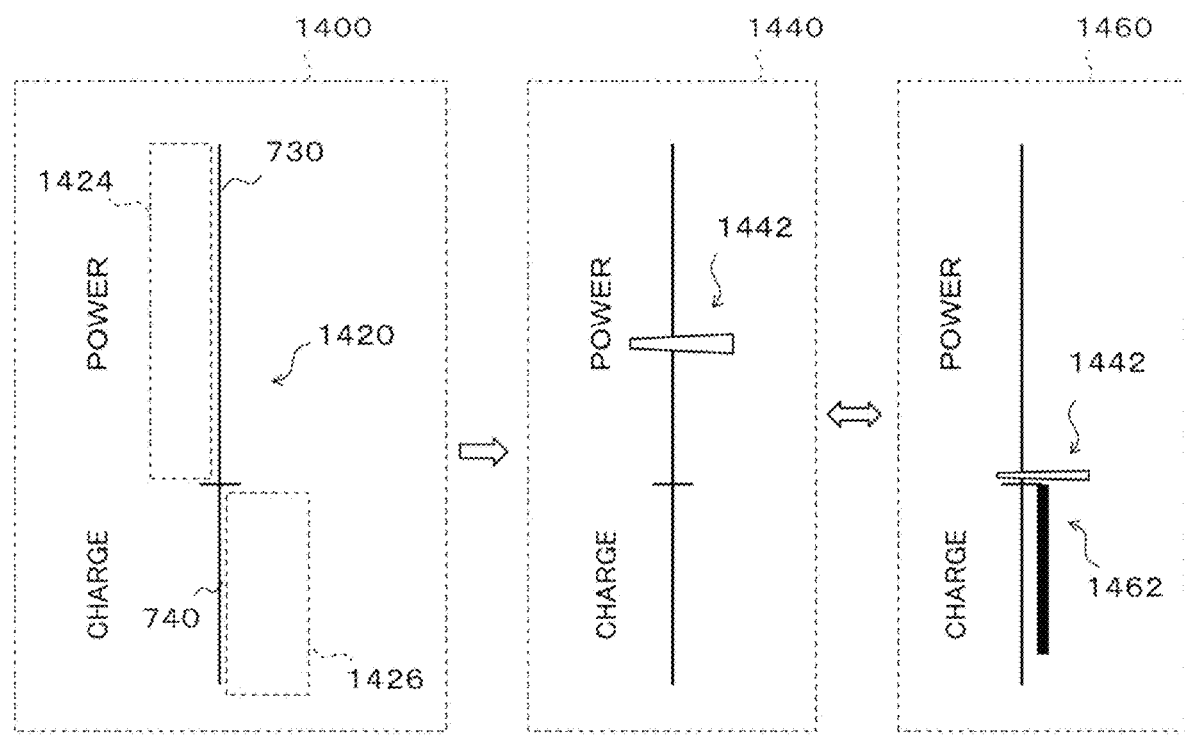
FIG. 14 schematically shows an example of a vehicle state display method using a dashboard image 1400.

FIG. 14 schematically shows an example of a vehicle state display method using a dashboard image 1400. In the present embodiment, the dashboard image 1400 has a scale object 1420. The dashboard image 1400 may be another example of the dashboard image 700. The scale object 1420 may be another example of the scale object 720.

In the dashboard image 700, the example of the scale object 720 has been described with reference to the case where the scale object 720 has an arc shape. Note that, the scale object 1420 is different from the scale object 720, in that it has a linear shape or a substantially linear shape. As regards the features except the difference, the scale object 1420 may have a similar configuration to the scale object 720. For example, in the scale object 1420, the output region 730 and the regeneration region 740 are arranged adjacent to each other.

In the dashboard image 1400, at least a part of the output index object is displayed in a region 1424 arranged on one side in a direction substantially orthogonal to an extension direction of the scale object 1420. Similarly, the regeneration index object is displayed in a region 1426 arranged on the other side in the direction substantially orthogonal to the extension direction of the scale object 1420.

An image 1440 shows an example of the instrument image 252 in a state where a part of an output index object 1442 is displayed in the region 1424 of the dashboard image 1400. Similarly, an image 1460 shows an example of the instrument image 252 in a state where a regeneration index object 1462 is displayed in the region 1426 of the dashboard image 1400.

In the present embodiment, the output index object 1442 has a needle shape or a rectangular shape. The output index object 1442 intersects with the scale object 1420 at a position of the output region 730 indicative of a present value of the output index. Thereby, at least a part of the output index object 1442 is arranged in the region 1424. The output index object 1442 may have a similar configuration to the output index object 1122.

In the present embodiment, the regeneration index object 1462 has a band shape. The regeneration index object 1462 may expand and contract in an extension direction of the scale object 1420, according to the present value of the regeneration index. The regeneration index object 1462 may indicate a level of the regenerative energy amount by a length of the regeneration index object 1462. The regeneration index object 1462 may have a similar configuration to the regeneration index object 1142.

Figure 15:
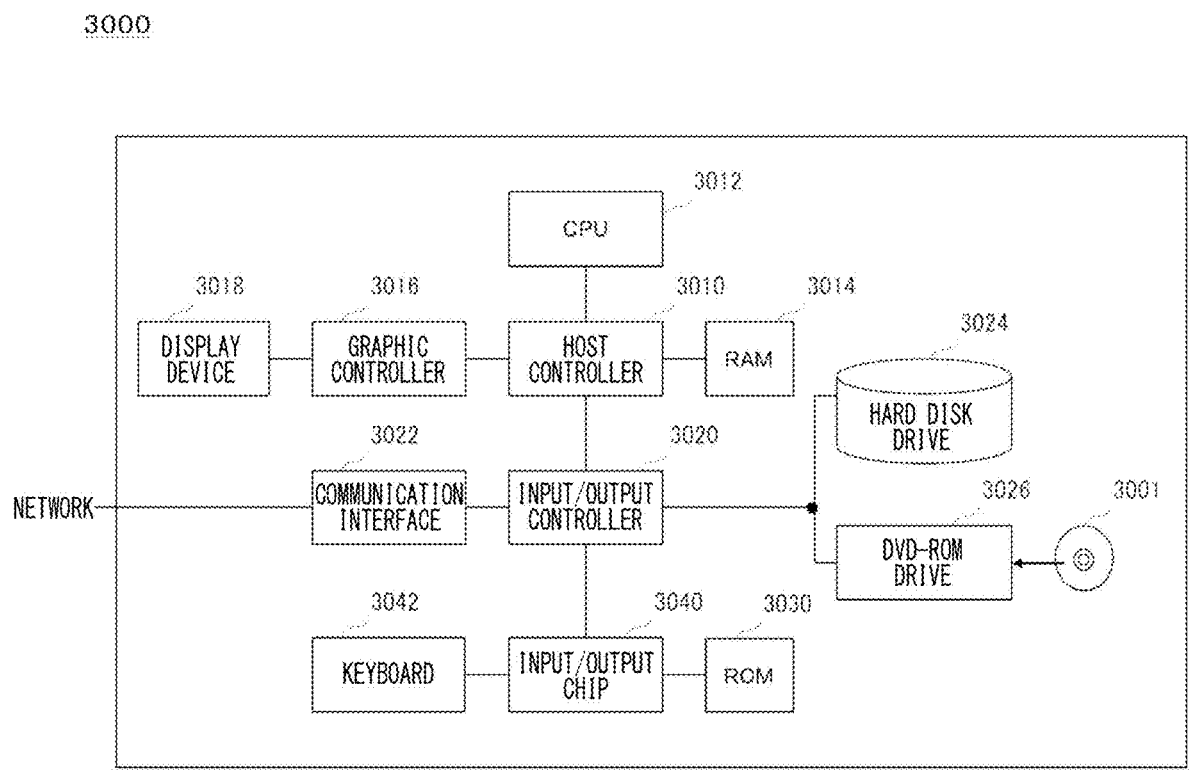
FIG. 15 schematically shows an example of a system configuration of a computer 3000.

FIG. 15 shows an example of a computer 3000 in which a plurality of aspects of the present invention may be entirely or partially embodied. A part of the vehicle 100 may be implemented by the computer 3000. For example, the control system 150 or a part thereof is implemented by the computer 3000.

A program that is installed in the computer 3000 can cause the computer 3000 to function as one or more "sections" in an operation or an apparatus associated with the embodiment of the present invention, or cause the computer 3000 to perform the operation or the one or more sections thereof, and/or cause the computer 3000 to perform processes of the embodiment of the present invention or steps thereof. Such program may be performed by a CPU 3012 so as to cause the computer 3000 to perform certain operations associated with some or all of the blocks of flowcharts and block diagrams described herein.

The computer 3000 according to the present embodiment includes a CPU 3012, a RAM 3014, a graphic controller 3016 and a display device 3018, which are mutually connected by a host controller 3010. The computer 3000 also includes input/output units such as a communication interface 3022, a hard disk drive 3024, a DVD-ROM drive 3026 and an IC card drive, which are connected to the host controller 3010 via an input/output controller 3020. The computer also includes legacy input/output units such as a ROM 3030 and a keyboard 3042, which are connected to the input/output controller 3020 via an input/output chip 3040.

The CPU 3012 is configured to operate, based on programs stored in the ROM 3030 and the RAM 3014, thereby controlling each unit. The graphic controller 3016 is configured to acquire image data, which is generated by the CPU 3012 on a frame buffer provided in the RAM 3014 or itself, and to cause the image data to be displayed on the display device 3018.

The communication interface 3022 is configured to perform communication with other electronic devices via a network. The hard disk drive 3024 is configured to store programs and data, which are used by the CPU 3012 within the computer 3000. The DVD-ROM drive 3026 is configured to read programs or data from a DVD-ROM 3001, and to provide the programs or data to the hard disk drive 3024 via the RAM 3014. The IC card drive is configured to read programs and data from an IC card, and/or to write programs and data to the IC card.

The ROM 3030 is configured to store a boot program that is performed by the computer 3000 at the time of activation, and/or a program depending on the hardware of the computer 3000. The input/output chip 3040 may be configured to connect a variety of input/output units to the input/output controller 3020 via a parallel port, a serial port, a keyboard port, a mouse port and the like.

A program is provided by a computer-readable storage medium such as a DVD-ROM 3001 or an IC card. The program is read from the computer-readable storage medium, is installed in the hard disk drive 3024, the RAM 3014 or the ROM 3030, which are examples of the computer-readable storage medium, and is executed by the CPU 3012. The information processing described in these programs is read into the computer 3000, resulting in cooperation between a program and the above-mentioned various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under control of the CPU 3012, reads transmission data stored on a transmission buffer region provided on a recording medium such as the RAM 3014, the hard disk drive 3024, the DVD-ROM 3001 or the IC card, and transmits the read transmission data to a network or writes reception data received from a network into a reception buffer region or the like provided on the recording medium.

In addition, the CPU 3012 is configured to cause all or a necessary portion of a file or a database, which has been stored in an external recording medium such as the hard disk drive 3024, the DVD-ROM drive 3026 (DVD-ROM 3001), the IC card and the like, to be read into the RAM 3014, thereby performing various types of processing on the data on the RAM 3014. The CPU 3012 may be configured to write back the processed data to the external recording medium.

Various types of information, such as various types of programs, data, tables, and databases, may be stored in the recording medium to undergo information processing. The CPU 3012 may also be configured to perform various types of processing on the data read from the RAM 3014, which includes various types of operations, processing of information, condition judging, conditional branching, unconditional branching, search/replacement of information and the like described in the present embodiment and designated by an instruction sequence of programs, and to write the result back to the RAM 3014. In addition, the CPU 3012 may be configured to search for information in a file, a database, and the like in the recording medium. For example, when a plurality of entries, each having an attribute value of a first attribute associated with an attribute value of a second attribute, is stored in the recording medium, the CPU 3012 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described programs or software modules may be stored on the computer 3000 or in a computer-readable storage medium in the vicinity of the computer 3000. In addition, a recording medium such as a hard disk or a RAM provided in a server system connected to a dedicated communication network or the Internet can be used as the computer-readable storage medium, thereby providing the programs to the computer 3000 via the network.

In the embodiment, the flowcharts and blocks of the block diagrams may represent steps of processes in which operations are performed or sections of apparatuses responsible for performing operations. Certain steps and sections may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, memory elements such as field-programmable gate arrays (FPGA), programmable logic arrays (PLA), and the like.

Computer-readable storage media may include any tangible device that can store instructions for execution by a suitable device, such that the computer-readable storage medium having instructions stored thereon comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, and the like. More specific examples of computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages such as the "C" programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc. so that the processor of a general purpose computer, a special purpose computer, or other programmable data processing apparatus or the programmable circuitry execute the computer-readable instructions so as to create means for performing operations specified in the flowcharts or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. In addition, the matters described in the specific embodiment can be applied to other embodiments without technical contradiction. Each constitutional element may have a similar feature to another constitutional element having the same name and different reference sign. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The present specification discloses following matters, for example.

[Item A-1] A control device configured to control an instrument configured to indicate a state of a moving body,
the moving body including a braking unit configured to brake the moving body, the control device comprising:
a braking information acquisition unit configured to acquire braking information about a braking force of the braking unit; and
a display control unit configured to control display of the instrument, based on the braking information acquired by the braking information acquisition unit; wherein
the braking information includes at least one of (i) first braking information indicative of a present setting of a plurality of settings relating to the braking force of the braking unit and (ii) second braking information indicative of a present value of the braking force of the braking unit,
the instrument has:
a first object having a line shape or band shape that is continuously visually recognized, and
a braking object indicative of a present value of a braking index that is an index relating to the braking force of the braking unit,
a partial region on the first object is formed with a braking region in which the present value of the braking index is indicated by a position on the region,
in the braking region, a plurality of marks each corresponding to each of the plurality of settings relating to the braking force of the braking unit is arranged in the vicinity of positions each corresponding to each of the plurality of settings, and
the display control unit is configured to control display of the braking object, based on at least one of (i) the present setting relating to the braking force indicated by the first braking information and (ii) the present value of the braking force indicated by the second braking information.

[Item A-2]
The control device according to Item A-1, wherein
when the braking information acquisition unit acquires the braking information including the first braking information, the display control unit controls display of at least one of the plurality of marks so that (i) at least one of a color, a pattern, a shape and a magnitude of a mark, which corresponds to the present setting relating to the braking force indicated by the first braking information, of the plurality of marks and (ii) at least one of a color, a pattern, a shape and a magnitude of a mark, which corresponds to at least one setting other than the present setting relating to the braking force indicated by the first braking information, of the plurality of marks are different from each other.

[Item A-3]

The control device according to Item A-1 or Item A-2, further comprising a setting specifying unit configured to specify one or more settings that a user is not permitted to select, based on the present setting relating to the braking force indicated by the first braking information, wherein
the display control unit controls display of at least one of the plurality of marks so that (i) at least one of a color, a pattern, a shape and a magnitude of a mark, which corresponds to the one or more settings specified by the setting specifying unit, of the plurality of marks and (ii) at least one of a color, a pattern, a shape and a magnitude of a mark, which corresponds to at least one setting other than the one or more settings specified by the setting specifying unit, of the plurality of marks are different from each other.

[Item A-4]

The control device according to one of Item A-1 to Item A-3, wherein the braking object indicates a level of the braking force by a length of the braking object, and wherein
when the braking information acquisition unit acquires the braking information including the first braking information,
the display control unit controls display of the braking object so that a length of the braking object is to be a length corresponding to the present setting relating to the braking force indicated by the first braking information.

[Item A-5]

The control device according to one of Item A-1 to Item A-4, wherein when the braking information acquisition unit acquires the braking information including the second braking information,
the display control unit controls display of the braking object so that a length of the braking object is to be a length corresponding to the present value of the braking force indicated by the second braking information.

[Item A-6]

The control device according to one of Item A-1 to Item A-5, wherein the moving body further includes an input unit configured to receive a user's instruction or operation on the moving body, wherein the control device further comprises an input information acquisition unit configured to acquire input information indicative of the user's instruction or operation received by the input unit,
wherein the instrument includes a display unit configured to display an image,
wherein the first object and the braking object are digital images that are displayed on the display unit, and wherein
when the instruction or operation indicated by the input information is a predetermined type of instruction or operation, the display control unit displays the first object and the braking object on the display unit.

[Item A-7]

The control device according to Item A-6, wherein the moving body further includes: an electricity storage unit configured to store electric energy, and
a drive unit configured to drive the moving body by using at least charging and discharging of the electricity storage unit,
wherein
the control device further comprises:
a drive information acquisition unit configured to acquire drive information including information about a regenerative energy amount of the drive unit, wherein
the display control unit is further configured to control display of the instrument, based on the drive information acquired by the drive information acquisition unit, wherein
when the instruction or operation indicated by the input information is an instruction or operation for accelerating the moving body or an instruction or operation for maintaining a speed of the moving body,
the display control unit displays, on the first object, a regeneration region in which a present value of a regeneration index, which is an index relating to the regenerative energy amount, is indicated, instead of the braking region,
displays a third object indicative of the present value of the regeneration index, instead of the braking object, and
controls display of the third object, based on the regenerative energy amount indicated by the drive information, and
wherein the present value of the regeneration index is indicated by a position in the regeneration region.

[Item A-8]

The control device according to Item A-7, wherein the drive information further includes information about an output energy amount of the drive unit,
wherein the instrument further includes a second object indicative of a present value of an output index that is an index relating to the output energy amount,
wherein a region different from the braking region on the first object is formed with an output region in which a present value of the output index is indicated by a position on the region,
wherein the output region and the braking region are arranged adjacent to each other on the first object, and
wherein the display control unit is configured to control display of the second object, based on the output energy amount indicated by the drive information.

[Item A-9]

A moving body comprising:
a braking unit configured to brake the moving body;
an instrument configured to indicate a state of the moving body; and
the control device for controlling the instrument according to one of Item A-1 to Item A-8.

[Item A-10]

A program for causing a computer to function as the control device according to one of Item A-1 to Item A-8.

[Item B-1] A control device configured to control an instrument configured to indicate a state of a moving body,
the moving body including:
an electricity storage unit configured to store electric energy, and
a drive unit configured to drive the moving body by using at least charging and discharging of the electricity storage unit, the control device comprising:
a drive information acquisition unit configured to acquire drive information about at least one of an output energy amount and a regenerative energy amount of the drive unit; and
a display control unit configured to control display of the instrument, based on the drive information acquired by the drive information acquisition unit; wherein
the instrument has:
a first object having a line shape or band shape that is continuously visually recognized,
a second object indicative of a present value of an output index that is an index relating to the output energy amount, and
a third object indicative of a present value of a regeneration index that is an index relating to the regenerative energy amount,
a partial region on the first object is formed with an output region in which the present value of the output index is indicated by a position on the region,
a region different from the output region on the first object is formed with a regeneration region in which the present value of the regeneration index is indicated by a position on the region,
the output region and the regeneration region are arranged adjacent to each other on the first object,
a shape of the second object and a shape of the third object are different, and
the display control unit is configured:
to control display of the second object, based on the output energy amount indicated by the drive information, and
to control display of the third object, based on the regenerative energy amount indicated by the drive information.

[Item B-2]
The control device according to Item B-1, wherein the second object intersects with the first object at a position in the output region indicating the present value of the output index.

[Item B-3]
The control device according to Item B-2, wherein the first object has substantially a conical curve shape or spiral shape, and wherein the second object is arranged on a line connecting (i) a focal point or center of the conical curve or a center of the spiral and (ii) the position in the output region indicative of the present value of the output index.

[Item B-4]
The control device according to Item B-2 or Item B-3, wherein the second object is a physical rotating pointer or a digital image imitating a physical rotating pointer.

[Item B-5]
The control device according to one of Items B-1 to Item B-4, wherein the third object,
has a band shape, and
expands and contracts along a shape of the regeneration region, according to the present value of the regeneration index.

[Item B-6]
The control device according to Item B-5, wherein the third object is arranged at a position at which it does not overlap the first object.

[Item B-7]
A control device configured to control an instrument configured to indicate a state of a moving body,
the moving body including:
an electricity storage unit configured to store electric energy, and
a drive unit configured to drive the moving body by using at least charging and discharging of the electricity storage unit,
the control device comprising:
a drive information acquisition unit configured to acquire drive information about at least one of an output energy amount and a regenerative energy amount of the drive unit; and
a display control unit configured to control display of the instrument, based on the drive information acquired by the drive information acquisition unit; wherein
the instrument has:
a first object having a line shape or band shape that is continuously visually recognized,
a second object indicative of a present value of an output index that is an index relating to the output energy amount, and
a third object indicative of a present value of a regeneration index that is an index relating to the regenerative energy amount,
a partial region on the first object is formed with an output region in which the present value of the output index is indicated by a position on the region,
a region different from the output region on the first object is formed with a regeneration region in which the present value of the regeneration index is indicated by a position on the region,
the output region and the regeneration region are arranged adjacent to each other on the first object,
at least a part of the second object is arranged on one side in a direction substantially orthogonal to an extension direction of the first object,
the third object is arranged on the other side in the direction substantially orthogonal to the extension direction of the first object, and
the display control unit is configured:
to control display of the second object, based on the output energy amount indicated by the drive information, and
to control display of the third object, based on the regenerative energy amount indicated by the drive information.

[Item B-8]
The control device according to one of Item B-1 to Item B-7, wherein a position indicative of a lower limit value on display of the output index on the first object coincides with a position indicative of a lower limit value on display of the regeneration index on the first object.

[Item B-9]
The control device according to one of Item B-1 to Item B-8, wherein a length of the output region is longer than a length of the regeneration region.

[Item B-10]
The control device according to one of Item B-1 to Item B-9, wherein a level of the present value of the output index with respect to an upper limit value and a lower limit value on display of the output index is indicated by a position of the second object in the output region, and
wherein a level of the present value of the regeneration index with respect to an upper limit value and a lower limit value on display of the regeneration index is indicated by a position of the third object in the regeneration region.

[Item B-11]

The control device according to one of Item B-1 to Item B-10, wherein the instrument is mounted on the moving body, and wherein the display control unit is configured to display an image, which constitutes at least a part of the instrument, on a display device mounted on the moving body.

[Item B-12]

The control device according to Item B-11, wherein when the present value of the output index indicated by the drive information is equal to or smaller than a lower limit value on display of the output index, the display control unit displays the second object at a position on the instrument at which the lower limit value on the display of the output index is displayed.

[Item B-13]

The control device according to Item B-11 or Item B-12, wherein the second object is a digital image, and wherein the display control unit is configured to display the second object so that at least one of a color, a pattern, a shape and a magnitude of at least a part of the second object is different (i) in a case where the present value of the output index indicated by the drive information is larger than the lower limit value on the display of the output index and (ii) in a case where the present value of the output index indicated by the drive information is equal to or smaller than the lower limit value on the display of the output index.

[Item B-14]

The control device according to one of Item B-11 to Item B-13, wherein the third object is a digital image, and wherein when the present value of the regeneration index indicated by the drive information is equal to or smaller than a lower limit value on display of the regeneration index, the display control unit does not display the third object.

[Item B-15]

The control device according to one of Item B-11 to Item B-14, wherein the moving body includes:

a braking unit configured to brake the moving body, and an input unit configured to receive a user's instruction or operation on the moving body, wherein the control device comprises:

an input information acquisition unit configured to acquire input information indicative of the user's instruction or operation received by the input unit; and a braking information acquisition unit configured to acquire braking information about a braking force of the braking unit, and wherein when the instruction or operation indicated by the input information is a predetermined type of instruction or operation, the display control unit displays a fourth object, which indicates a present value of a braking index that is an index relating to the braking force of the braking unit, instead of the third object, and displays a braking region, in which the present value of the braking index is indicated by a position on the region, in a region different from the output region on the first object, instead of the regeneration region.

[Item B-16]

The control device according to Item B-15, wherein a level of the present value of the braking index with respect to an upper limit value and a lower limit value on display of the braking index is indicated by a position of the fourth object in the braking region.

[Item B-17]

The control device according to Item B-15 or Item B-16, wherein the braking information includes at least one of (i) first braking information, which indicates a present setting of a plurality of settings relating to the braking force of the braking unit and (ii) second braking information indicative of a present value of the braking force of the braking unit, and wherein the braking index is an index for indicating at least one of (i) the present setting relating to the braking force and (ii) the present value of the braking force.

[Item B-18]

The control device according to one of Item B-15 to Item B-17, wherein at least a part of the drive unit is configured to function as the braking unit.

[Item B-19]

A moving body comprising:

an electricity storage unit configured to store electric energy;

a drive unit configured to drive the moving body by using at least charging and discharging of the electricity storage unit;

an instrument configured to indicate a state of the moving body; and the control device for controlling the instrument according to one of Item B-1 to Item B-18.

[Item B-20]

A program for causing a computer to function as the control device according to one of Item B-1 to Item B-18.

EXPLANATION OF REFERENCES

100: vehicle, 120: input/output system, 130: vehicle motion system, 140: sensing system, 150: control system, 220: driving device, 222: steering wheel, 224: paddle shift, 226: accelerator pedal, 228: brake pedal, 240: instrument panel, 242: mechanical instrument, 244: mechanical switch, 250: display device, 252: instrument image, 254: switch image, 320: wheels, 330: electricity storage system, 340: power system, 342: electricity generator, 344: internal combustion engine, 346: electric motor, 350: power transmission system, 360: mechanical brake, 372: drive system, 374: braking system, 420: vehicle output measurement unit, 430: vehicle braking force measurement unit, 440: output electric power measurement unit, 450: regenerative electric power measurement unit, 520: input control ECU, 530: display control ECU, 540: motion control ECU, 550: storage unit, 552: shift information storage unit, 554: image data storage unit, 620: steering amount acquisition unit, 630: acceleration operation amount acquisition unit, 640: braking level acquisition unit, 650: braking operation amount, 660: sensor output acquisition unit, 700: dashboard image, 720: scale object, 722: end portion, 724: end portion, 730: output region, 740: regeneration region, 750: boundary, 820: center, 840: braking force level indicator, 902: image, 904: image, 906: image, 920: mark, 932: mark, 934: mark, 936: mark, 938: mark, 1000: dashboard image, 1020: scale object, 1022: end portion, 1024: end portion, 1040: braking region, 1050: boundary, 1120: image, 1122: output index object, 1140: image, 1142: regeneration index object, 1220: image, 1240: image, 1242: braking index object, 1300: dashboard image,

1320: scale object, 1324: region, 1326: region, 1340: image, 1342: output index object, 1360: image, 1362: regeneration index object, 1400: dashboard image, 1420: scale object, 1424: region, 1426: region, 1440: image, 1442: output index object, 1460: image, 1462: regeneration index object, 3000: computer, 3001: DVD-ROM, 3010: host controller, 3012: CPU, 3014: RAM, 3016: graphic controller, 3018: display device, 3020: input/output controller, 3022: communication interface, 3024: hard disk drive, 3026: DVD-ROM drive, 3030: ROM, 3040: input/output chip, 3042: keyboard

What is claimed is:

1. A control device configured to control an instrument configured to indicate a state of a moving body,
the moving body including:
    a braking unit configured to brake the moving body;
    an input unit configured to receive a user's instruction or operation on the moving body;
    an electricity storage unit configured to store electric energy; and
    a drive unit configured to drive the moving body by using at least charging and discharging of the electricity storage unit,
the control device comprising:
    a braking information acquisition unit configured to acquire braking information about a braking force of the braking unit;
    a display control unit configured to control display of the instrument, based on the braking information acquired by the braking information acquisition unit;
    an input information acquisition unit configured to acquire input information indicative of the user's instruction or operation received by the input unit; and
    a drive information acquisition unit configured to acquire drive information including information about a regenerative energy amount of the drive unit, wherein
the braking information includes at least one of (i) first braking information indicative of a present setting of a plurality of settings relating to the braking force of the braking unit and/or (ii) second braking information indicative of a present value of the braking force of the braking unit,
the instrument has:
    a first object having a line shape or band shape that is continuously visually recognized, and
    a braking object indicative of a present value of a braking index that is an index relating to the braking force of the braking unit,
a partial region on the first object is formed with a braking region in which the present value of the braking index is indicated by a position on the partial region,
in the braking region, a plurality of marks each corresponding to each of a plurality of settings relating to the braking force of the braking unit is arranged in the vicinity of positions each corresponding to each of the plurality of settings,
the display control unit is configured to control display of the braking object, based on at least one of (i) the present setting relating to the braking force indicated by the first braking information and/or (ii) the present value of the braking force indicated by the second braking information, and
the display control unit is further configured to, based on the input information, display, on the first object, a regeneration region in which a present value of a regeneration index that is an index relating to the regenerative energy amount is indicated, instead of the braking region.

2. The control device according to claim 1, wherein when the braking information acquisition unit acquires the braking information including the first braking information, the display control unit controls display of at least one of the plurality of marks so that (i) at least one of a color, a pattern, a shape and/or a magnitude of a mark, which corresponds to the present setting relating to the braking force indicated by the first braking information, of the plurality of marks and (ii) at least one of a color, a pattern, a shape and/or a magnitude of a mark, which corresponds to at least one setting other than the present setting relating to the braking force indicated by the first braking information, of the plurality of marks are different from each other.

3. The control device according to claim 1, further comprising a setting specifying unit configured to specify one or more settings that a user is not permitted to select, based on the present setting relating to the braking force indicated by the first braking information, wherein
    the display control unit is configured to control display of at least one of the plurality of marks so that (i) at least one of a color, a pattern, a shape and/or a magnitude of a mark, which corresponds to the one or more settings specified by the setting specifying unit, of the plurality of marks and (ii) at least one of a color, a pattern, a shape and/or a magnitude of a mark, which corresponds to at least one setting other than the one or more settings specified by the setting specifying unit, of the plurality of marks are different from each other.

4. The control device according to claim 2, further comprising a setting specifying unit configured to specify one or more settings that a user is not permitted to select, based on the present setting relating to the braking force indicated by the first braking information, wherein
    the display control unit is configured to control display of at least one of the plurality of marks so that (i) at least one of a color, a pattern, a shape and/or a magnitude of a mark, which corresponds to the one or more settings specified by the setting specifying unit, of the plurality of marks and (ii) at least one of a color, a pattern, a shape and/or a magnitude of a mark, which corresponds to at least one setting other than the one or more settings specified by the setting specifying unit, of the plurality of marks are different from each other.

5. The control device according to claim 1, wherein
the braking object indicates a level of the braking force by a length of the braking object, and
when the braking information acquisition unit acquires the braking information including the first braking information, the display control unit controls display of the braking object so that a length of the braking object becomes a length corresponding to the present setting relating to the braking force indicated by the first braking information.

6. The control device according to claim 2, wherein
the braking object indicates a level of the braking force by a length of the braking object, and
when the braking information acquisition unit acquires the braking information including the first braking information, the display control unit controls display of the braking object so that a length of the braking object becomes a length corresponding to the present setting relating to the braking force indicated by the first braking information.

7. The control device according to claim 3, wherein
the braking object indicates a level of the braking force by a length of the braking object, and
when the braking information acquisition unit acquires the braking information including the first braking information, the display control unit controls display of the braking object so that a length of the braking object becomes a length corresponding to the present setting relating to the braking force indicated by the first braking information.

8. The control device according to claim 1, wherein
when the braking information acquisition unit acquires the braking information including the second braking information, the display control unit controls display of the braking object so that a length of the braking object becomes a length corresponding to the present value of the braking force indicated by the second braking information.

9. The control device according to claim 2, wherein
when the braking information acquisition unit acquires the braking information including the second braking information, the display control unit controls display of the braking object so that a length of the braking object becomes a length corresponding to the present value of the braking force indicated by the second braking information.

10. The control device according to claim 3, wherein
when the braking information acquisition unit acquires the braking information including the second braking information, the display control unit controls display of the braking object so that a length of the braking object becomes a length corresponding to the present value of the braking force indicated by the second braking information.

11. The control device according to claim 4, wherein
when the braking information acquisition unit acquires the braking information including the second braking information, the display control unit controls display of the braking object so that a length of the braking object becomes a length corresponding to the present value of the braking force indicated by the second braking information.

12. The control device according to claim 1, wherein
the instrument includes a display unit configured to display an image,
the first object and the braking object are digital images that are displayed on the display unit, and
when the instruction or operation indicated by the input information is a predetermined type of instruction or operation, the display control unit displays the first object and the braking object on the display unit.

13. The control device according to claim 2, wherein
the instrument includes a display unit configured to display an image,
the first object and the braking object are digital images that are displayed on the display unit, and
when the instruction or operation indicated by the input information is a predetermined type of instruction or operation, the display control unit displays the first object and the braking object on the display unit.

14. The control device according to claim 3, wherein
the instrument includes a display unit configured to display an image,
the first object and the braking object are digital images that are displayed on the display unit, and
when the instruction or operation indicated by the input information is a predetermined type of instruction or operation, the display control unit displays the first object and the braking object on the display unit.

15. The control device according to claim 4, wherein
the instrument includes a display unit configured to display an image,
the first object and the braking object are digital images that are displayed on the display unit, and
when the instruction or operation indicated by the input information is a predetermined type of instruction or operation, the display control unit displays the first object and the braking object on the display unit.

16. The control device according to claim 5, wherein
the instrument includes a display unit configured to display an image,
the first object and the braking object are digital images that are displayed on the display unit, and
when the instruction or operation indicated by the input information is a predetermined type of instruction or operation, the display control unit displays the first object and the braking object on the display unit.

17. The control device according to claim 12, wherein
the display control unit is further configured to control display of the instrument, based on the drive information acquired by the drive information acquisition unit,
when the instruction or operation indicated by the input information is an instruction or operation for accelerating the moving body or an instruction or operation for maintaining a speed of the moving body,
the display control unit:
displays a third object indicative of the present value of the regeneration index, instead of the braking object, and
controls display of the third object, based on the regenerative energy amount indicated by the drive information, and
the present value of the regeneration index is indicated by a position in the regeneration region.

18. The control device according to claim 17, wherein
the drive information further includes information about an output energy amount of the drive unit,
the instrument further includes a second object indicative of a present value of an output index that is an index relating to the output energy amount,
a region different from the braking region on the first object is formed with an output region in which a present value of the output index is indicated by a position on the region,
the output region and the braking region are arranged adjacent to each other on the first object, and
the display control unit is configured to control display of the second object, based on the output energy amount indicated by the drive information.

19. A moving body comprising:
a braking unit configured to brake the moving body;
an instrument configured to indicate a state of the moving body; and
the control device according to claim 1 for controlling the instrument.

20. A non-transitory computer-readable storage medium having a program stored thereon, the program being a program for causing a computer to function as a control device configured to control an instrument configured to indicate a state of a moving body, wherein
the moving body includes:
a braking unit configured to brake the moving body;
an input unit configured to receive a user's instruction or operation on the moving body;

an electricity storage unit configured to store electric energy; and a drive unit configured to drive the moving body by using at least charging and discharging of the electricity storage unit, the control device comprises:

a braking information acquisition unit configured to acquire braking information about a braking force of the braking unit;

a display control unit configured to control display of the instrument, based on the braking information acquired by the braking information acquisition unit an input information acquisition unit configured to acquire input information indicative of the user's instruction or operation received by the input unit; and a drive information acquisition unit configured to acquire drive information including information about a regenerative energy amount of the drive unit, the braking information includes at least one of (i) first braking information indicative of a present setting of a plurality of settings relating to the braking force of the braking unit and/or (ii) second braking information indicative of a present value of the braking force of the braking unit, the instrument has:

a first object having a line shape or band shape that is continuously visually recognized, and a braking object indicative of a present value of a braking index that is an index relating to the braking force of the braking unit, a partial region on the first object is formed with a braking region in which the present value of the braking index is indicated by a position on the partial region, in the braking region, a plurality of marks each corresponding to each of a plurality of settings relating to the braking force of the braking unit is arranged in the vicinity of positions each corresponding to each of the plurality of settings, the display control unit is configured to control display of the braking object, based on at least one of (i) the present setting relating to the braking force indicated by the first braking information and/or (ii) the present value of the braking force indicated by the second braking information, and the display control unit is further configured to, based on the input information, display, on the first object, a regeneration region in which a present value of a regeneration index that is an index relating to the regenerative energy amount is indicated, instead of the braking region.

\* \* \* \* \*